US008321085B2

(12) United States Patent
Saito

(10) Patent No.: US 8,321,085 B2
(45) Date of Patent: Nov. 27, 2012

(54) WORKING VEHICLE, VEHICLE SPEED CONTROL METHOD OF WORKING VEHICLE, AND VEHICLE SPEED CONTROLLER OF WORKING VEHICLE

(75) Inventor: Yoshiaki Saito, Mooka (JP)

(73) Assignee: Komatsu Ltd., Tokyo (JP)

( * ) Notice: Subject to any disclaimer, the term of this patent is extended or adjusted under 35 U.S.C. 154(b) by 486 days.

(21) Appl. No.: 12/452,465

(22) PCT Filed: Jul. 8, 2008

(86) PCT No.: PCT/JP2008/062319
§ 371 (c)(1),
(2), (4) Date: Dec. 31, 2009

(87) PCT Pub. No.: WO2009/011248
PCT Pub. Date: Jan. 22, 2009

(65) Prior Publication Data
US 2010/0145564 A1    Jun. 10, 2010

(30) Foreign Application Priority Data
Jul. 18, 2007 (JP) .................................. 2007-187553

(51) Int. Cl.
*G01M 17/00* (2006.01)
(52) U.S. Cl. .......... 701/31.4; 701/29.1; 701/50; 701/79; 701/67; 701/87; 172/4.5
(58) Field of Classification Search ................. 701/31.4, 701/50, 84, 87, 79, 67, 90, 29.1; 172/4.5, 172/9
See application file for complete search history.

(56) References Cited

U.S. PATENT DOCUMENTS

| 5,211,680 | A | * | 5/1993 | Sumimoto et al. ............ 477/109 |
| 5,674,151 | A | * | 10/1997 | de Schepper et al. ......... 477/120 |
| 6,236,929 | B1 | | 5/2001 | Sen et al. |
| 6,616,559 | B1 | * | 9/2003 | Hori et al. ....................... 475/23 |

(Continued)

FOREIGN PATENT DOCUMENTS
DE    103 14 337 A1    10/2004
(Continued)

OTHER PUBLICATIONS

International Search Report mailed on Aug. 12, 2008 for the corresponding International patent application No. PCT/JP2008/062319 (English translation enclosed).

(Continued)

*Primary Examiner* — Gertrude Arthur Jeanglaude
(74) *Attorney, Agent, or Firm* — Posz Law Group, PLC

(57) ABSTRACT

A working vehicle of the present invention achieves more stabilized constant speed traveling. A vehicle speed control section 20A of a controller 2 calculates a target drive force required for constant speed traveling on the basis of a preset standard traveling resistance (S1). And, on the basis of an output rotational speed (S2) and the target drive force (S1) of a torque converter 14, the vehicle speed control section 20A determines a target input rotational speed (S3) to be inputted to the torque converter 14, and sets a clutch pressure (S5) so as to eliminate a difference between the target input rotational speed and an actual input rotational speed (S4). A standard traveling resistance correction section 20B corrects a standard traveling resistance according to state of a road surface, long term change of components, and so on. Due to this, it is possible to perform stabilized constant speed traveling.

15 Claims, 18 Drawing Sheets

U.S. PATENT DOCUMENTS 6,684,144 B2 * 1/2004 Sekii et al. .................. 701/51
2002/0147552 A1 10/2002 Fonkalsrud et al.
2004/0192505 A1 9/2004 Leber et al.

FOREIGN PATENT DOCUMENTS

| EP | 1462293 A2 | 9/2004 |
|---|---|---|
| JP | 11-181841 A | 7/1999 |
| JP | 2000-118264 A | 4/2000 |
| JP | 2004-299415 A | 10/2004 |

OTHER PUBLICATIONS

Extended European Search Report dated Aug. 29, 2011 in corresponding EP Application No. 08790956.0.

* cited by examiner

FIG.14
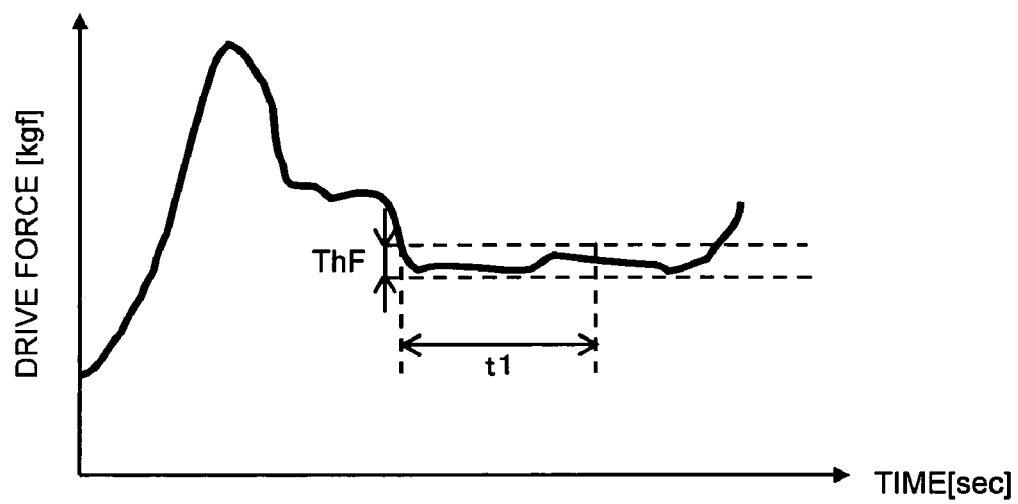
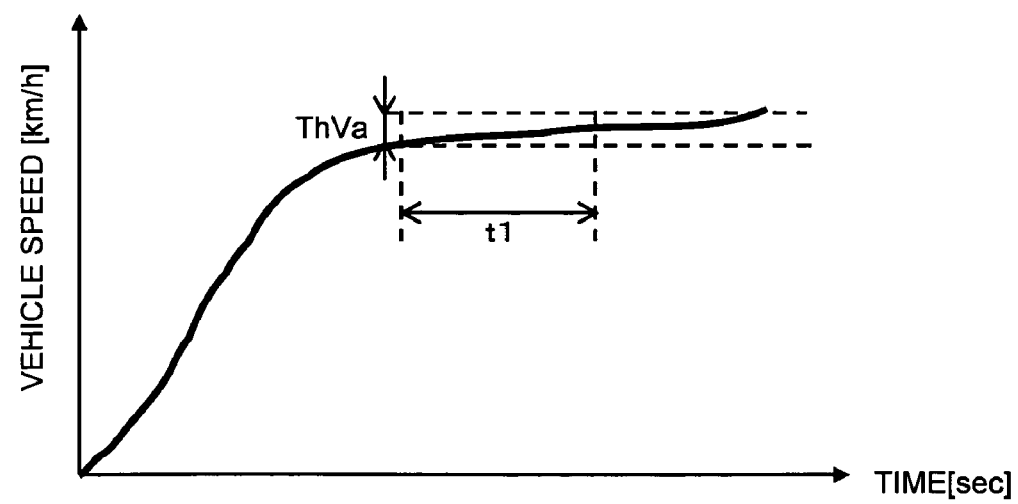

WORKING VEHICLE, VEHICLE SPEED CONTROL METHOD OF WORKING VEHICLE, AND VEHICLE SPEED CONTROLLER OF WORKING VEHICLE

CROSS REFERENCE TO RELATED APPLICATIONS

This application is a U.S. national stage application of PCT/JP2008/062319 filed on Jul. 8, 2008, and claims priority to, and incorporates by reference, Japanese Patent Application No. 2007-187553 filed on Jul. 18, 2007.

TECHNICAL FIELD

The present invention relates to a working vehicle, to a vehicle speed control method of a working vehicle, and to a vehicle speed controller of a working vehicle.

BACKGROUND OF THE INVENTION

With a working vehicle such as a wheel loader, an output of an engine is used as power for working and power for traveling. With a wheel loader, a load such as earth or sand or the like is scooped up with a bucket, and is loaded onto a bed of a truck or the like. Thus, in the prior art, it is necessary to consider the balance between traveling speed of the wheel loader and raising speed of the bucket, and clutch pressure is controlled so as to maintain the traveling speed at a constant speed during loading work (refer to Patent Document #1).

It should be understood that techniques are known for implementing constant speed traveling by controlling a throttle opening amount of an engine (refer to Patent Document #2), and for restricting vehicle speed control during an interval from the start of dragging of a clutch until the clutch is completely engaged (refer to Patent Document #3), although there is no such prior art particularly related to a working vehicle.

Patent Document #1: Japanese Laid-Open Patent Publication Heisei 11-181841;
Patent Document #2: Japanese Laid-Open Patent Publication 2000-118264;
Patent Document #3: Japanese Laid-Open Patent Publication 2004-299415.

BRIEF SUMMARY OF THE INVENTION

With this prior art technique, since the clutch pressure is controlled on the basis of the difference between an actual vehicle speed and a target vehicle speed, acceleration and deceleration are repeated over a comparatively short cycle. Although this acceleration and deceleration at a short cycle may not cause any hindrance in operation of the working vehicle, there is scope for improvement from the point of view of the ride feeling.

The present invention has been conceived in consideration of the problem described above, and one object thereof is to provide a working vehicle, a vehicle speed control method of a working vehicle, and a vehicle speed controller of a working vehicle, which can achieve more stabilized constant speed traveling. Another object of the present invention is to provide a working vehicle, a vehicle speed control method of a working vehicle, and a vehicle speed controller of a working vehicle, which can achieve more stabilized constant speed traveling by determining a drive force necessary for constant speed traveling on the basis of a traveling resistance which is considered as being standard, and by calculating the clutch pressure required for obtaining the target drive force. Yet further objects of the present invention will become apparent from the subsequent description of embodiments thereof.

BRIEF DESCRIPTION OF THE DRAWINGS

FIG. 14 is a graph showing a condition for correcting the standard traveling resistance.

EXPLANATION OF THE REFERENCE SYMBOLS

Figure 1:
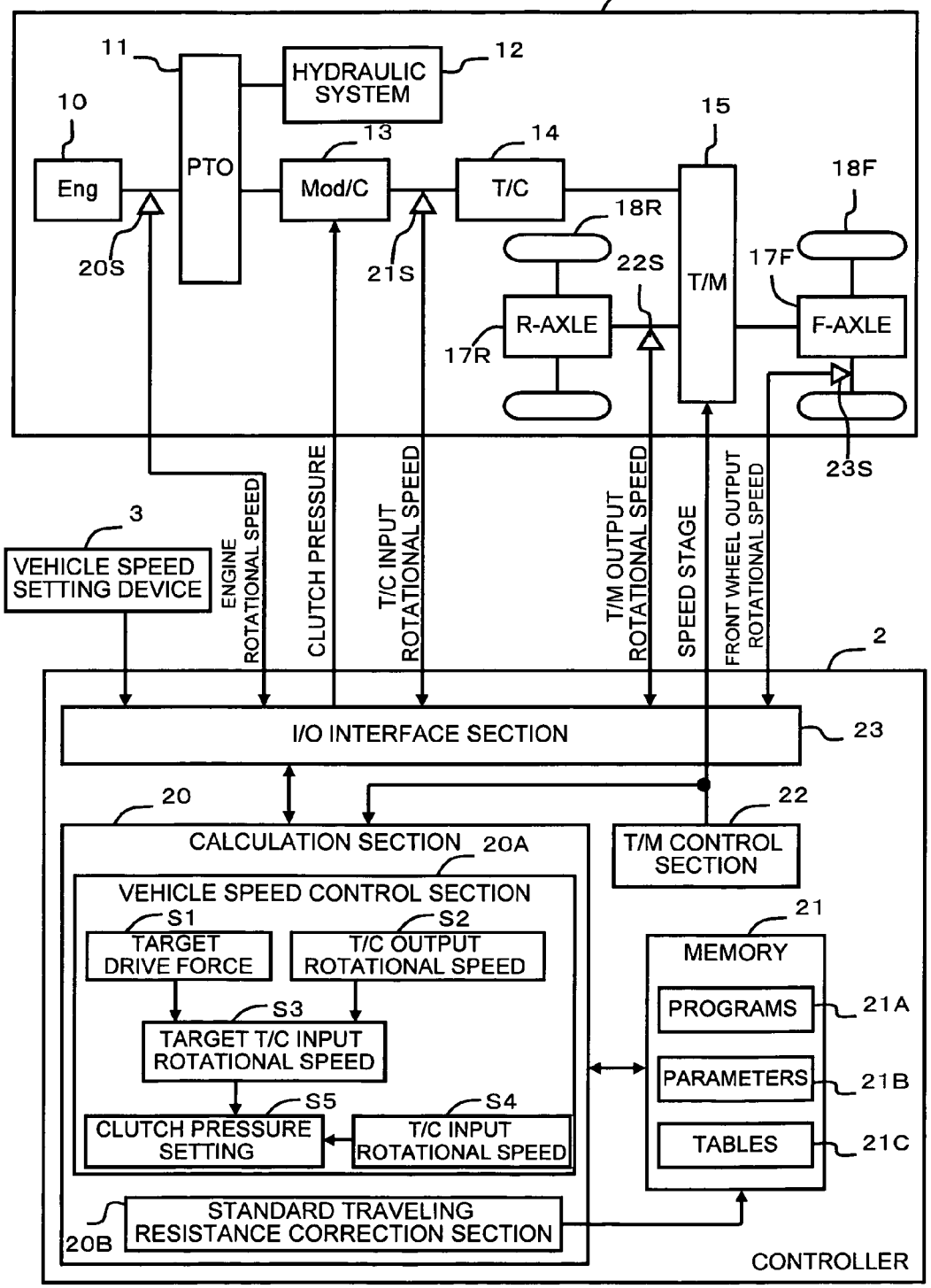
FIG. 1 is an explanatory figure showing the overall structure of a working vehicle according to this embodiment.

1: mechanical structure; 2: controller; 3: vehicle speed setting device; 10: engine; 11: output splitter; 12: hydraulic system; 13: clutch; 14: torque converter; 15: transmission; 17F, 17R: axles; 18F, 18R: tires; 20S: engine rotational speed sensor; 21S: torque converter input rotational speed sensor; 22S: transmission output rotational speed sensor; 23S: front wheel output rotational speed sensor; 20: calculation section; 20A: vehicle speed control section; 20B: standard traveling resistance correction section; 21A: program; 21B: parameter; 21C: table; 22: transmission control section; 23: I/O interface section.

DETAILED DESCRIPTION OF THE INVENTION

In order to solve the problems described above, in a working vehicle which includes an engine, a splitter for dividing the output of the engine between a working apparatus system and a traveling system, a clutch connected to the engine via the splitter, a torque converter connected to the clutch, a transmission connected to the torque converter and transmitting drive force to drive wheels, a vehicle speed detection means which detects actual vehicle speed, and a controller which performs control so that the actual vehicle speed detected by the vehicle speed detection means becomes equal to a target vehicle speed set in advance, the controller includes: a target drive force calculation means which calculates a target drive force required for implementing the target vehicle speed using a standard traveling resistance set in advance and vehicle body weight; a target input rotational speed calculation means which calculates a target input rotational speed, being a target value for rotational speed to be inputted to the torque converter to provide the calculated target drive force; an actual input rotational speed detection means which detects the actual rotational speed inputted to the torque converter; and a clutch pressure setting means which sets a clutch pressure for the clutch so that the detected actual input rotational speed becomes equal to the target input rotational speed.

The controller may include a correction means for correcting the standard traveling resistance on the basis of a deviation between the target vehicle speed and the actual vehicle speed.

The correction means may include a start condition determination means which makes a determination as to whether or not a start condition for correcting the standard resistance has become valid, and a standard traveling resistance setting means which changes the standard traveling resistance stepwise within a range set in advance, if it is determined by the start condition determination means that the start condition has become valid.

The start condition determination means may determine that the start condition has become valid if, within a predetermined interval set in advance, a change of the drive force transmitted to a tire is less than or equal to a predetermined threshold value, and moreover a change of the actual vehicle speed is less than or equal to another predetermined threshold value.

The start condition determination means may determine that the start condition has become valid if, within a predetermined interval set in advance, the change of the drive force transmitted to a tire is less than or equal to a predetermined threshold value, the change of the actual vehicle speed is less than or equal to another predetermined threshold value, and moreover a predetermined interval has elapsed from when correction was performed the previous time.

The start condition determination means may detect the number of times, within a predetermined interval set in advance, that an absolute value of the deviation has exceeded a predetermined value set in advance, and may determine that the start condition has become valid if the number of times has reached a predetermined number of times set in advance.

The target drive force calculation means may be adapted to obtain a transmission input torque by obtaining a target drive force by multiplying the vehicle body weight by the standard traveling resistance, by obtaining an axle output torque by multiplying the target drive force by an effective radius of the drive wheel, and moreover by dividing the axle output torque by an axle gear ratio and also by a gear ratio corresponding to the speed stage set for the transmission; and the target input rotational speed calculation means may be adapted to calculate the target input rotational speed on the basis of an output rotational speed detected by an output rotational speed detection means which detects the output rotational speed from the torque converter, and of the transmission input torque obtained from the target drive force calculation means.

The controller may be adapted to execute both a first control method if the deviation, between the target vehicle speed and the actual vehicle speed is less than a threshold value set in advance, and a second control method if the deviation is greater than or equal to the threshold value; and in the first control method, the following steps may be executed: a step of calculating a target drive force required for implementing the target vehicle speed, using a standard traveling resistance set in advance and vehicle body weight; a step of calculating a target input rotational speed, being a target value for rotational speed to be inputted to the torque converter to provide the calculated target drive force; a step of detecting the actual rotational speed inputted to the torque converter; and a step of setting a clutch pressure for the clutch so that the detected actual input rotational speed becomes equal to the target input rotational speed; and, in the second control method, the following step may be executed: a step of decreasing the clutch pressure by a predetermined value set in advance if the actual vehicle speed is greater than the target vehicle speed, and increasing the clutch pressure by the predetermined value if the actual vehicle speed is smaller than the target vehicle speed.

The controller may include a correction means for correcting the standard traveling resistance on the basis of the deviation between the target vehicle speed and the actual vehicle speed; the correction means may have a first correction mode and a second correction mode; in the first correction mode, the standard traveling resistance may be changed if, during a predetermined interval set in advance, the change of the drive force transmitted to a tire is less than or equal to a predetermined threshold value, and moreover the chance of the actual vehicle speed is less than or equal to another predetermined threshold value; and in the second correction mode, the standard traveling resistance may be changed if, during a predetermined interval set in advance, a number of times of transition between the first control method and the second control method has reached a predetermined number of times.

And, according to another aspect of the present invention, in a method for controlling the vehicle speed of a working machine which includes an engine, a clutch connected to the engine, a torque converter connected to the clutch, a transmission connected to the torque converter and transmitting drive force to drive wheels, and a vehicle speed detection means which detects actual vehicle speed, the following steps are executed: a step of calculating a target drive force required for implementing a target vehicle speed set in advance, using a standard traveling resistance set in advance and vehicle body weight; a step of calculating a target input rotational speed, being a target value for rotational speed to be inputted to said torque converter to provide the calculated target drive force; a step of detecting an actual rotational speed inputted to said torque converter; and a step of setting a clutch pressure for said clutch so that the detected actual input rotational speed becomes equal to said target input rotational speed.

And, according to yet another aspect of the present invention, a controller for controlling the vehicle speed of a working vehicle which includes an engine, a splitter for dividing the output of the engine between a working apparatus system and a traveling system, a clutch connected to said engine via the splitter, a torque converter connected to the clutch, a transmission connected to the torque converter and transmitting drive force to drive wheels, and a vehicle speed detection means which detects actual vehicle speed, includes a target drive force calculation means which calculates a target drive force required for implementing said target vehicle speed using a standard traveling resistance set in advance and vehicle body weight; a target input rotational speed calculation means which calculates a target input rotational speed, being a target value for rotational speed to be inputted to said torque converter to provide the calculated target drive force; an actual input rotational speed detection means which detects an actual rotational speed inputted to said torque converter; and a clutch pressure setting means which sets a clutch pressure for said clutch so that the detected actual input rotational speed becomes equal to said target input rotational speed.

ADVANTAGES OF THE INVENTION

Since, according to the present invention, the drive force which is necessary for constant speed traveling is calculated on the basis of the standard traveling resistance, and the clutch pressure is controlled so that the target drive force is obtained, accordingly it is possible to achieve more stabilized constant speed traveling, and it is possible to improve the ride feeling for the operator.

Moreover since, according to the present invention, it is possible to correct the standard traveling resistance on the basis of deviation between the target vehicle speed and the actual vehicle speed, accordingly it is possible to control while including environmental changes such as changes of the state of the road surface and so on, and long term changes of vehicle components and so on, in the standard traveling resistance, so that it is possible to achieve stabilized constant speed traveling over the comparatively long term.

BEST MODES FOR CARRYING OUT THE INVENTION

In the following, embodiments of the present invention will be explained in detail with reference to the drawings. In these embodiments, as described below, a target drive force which is required for constant speed traveling is obtained on the basis of a standard traveling resistance which is considered as being standard, and a clutch pressure is controlled so that the target drive force is obtained. Moreover, in this embodiment, changes of the traveling environment are dealt with automatically by correcting the standard traveling resistance on the basis of deviation between the actual vehicle speed and the target vehicle speed.

Embodiment One

In the following, an example of embodiment of the present invention will be presented as applied to a wheel loader, which serves as an example of a working vehicle. However, this embodiment could also be applied to a working vehicle other than a wheel loader, provided that the working vehicle is equipped with a clutch or a torque converter or the like.

FIG. 1 is an explanatory figure, schematically showing the overall structure of a working vehicle. The wheel loader may broadly be divided into a mechanical structure 1 and a control structure 2 (hereinafter termed the "controller"). First the mechanical structure 1 will be explained, and then the controller 2 will be explained.

The mechanical structure may broadly be divided into a working apparatus system and a traveling system. The working apparatus system may comprise, for example, a boom which is provided extending from the front of the vehicle body and which is rotatable, a bucket which is provided at the end of the boom and which is rotatable, a boom cylinder for rotating the boom, a bucket cylinder for rotating the bucket, a hydraulic system 12 for supplying hydraulic fluid to the bucket cylinder and the boom cylinder, and so on.

The traveling system comprises a modulated clutch (hereinafter simply termed the "clutch") 13, a torque converter 14, a transmission 15, axles 17F and 17R, tires 18F and 18R, and so on. It should be understood that, for convenience of explanation, in the drawing, the clutch is abbreviated as "Mod/C", the torque converter as "T/C", and the transmission as "T/M".

Output is supplied from an engine 10 to the above described working apparatus system and traveling system via an output splitter (PTO: Power Take Off) 20. In other words, it is arranged for the hydraulic system 12 and the traveling system each to be able to extract engine output separately. The clutch 13 transmits the output of the engine 10 (i.e. its rotational speed and torque) to the torque converter 14. The clutch pressure of the clutch 13 is controlled by a control signal which is inputted from the controller 2.

Sensors 20S through 23S are provided at predetermined positions of the mechanical structure 1. An engine rotational speed sensor 20S detects the engine rotational speed as an electrical signal, which it outputs to the controller 2. The controller 2 is able to obtain the rotational speed being inputted to the clutch 13 from the engine rotational speed and a gear ratio of the output splitter 11.

A torque converter input rotational speed sensor 21S detects a rotational speed being inputted to the torque converter 14 as an electrical signal, which it outputs to the controller 2. The rotational speed being inputted to the torque converter is also the rotational speed being outputted from the clutch 13. Accordingly, the sensor 21S may alternatively be termed a clutch output rotational speed sensor.

A transmission output rotational speed sensor 22S detects an output rotational speed of the transmission 15 as an electrical signal, which it inputs to the controller 2. Thus the controller 2 is able to calculate a rotational speed being inputted to the transmission 15 from the output rotational speed of the transmission 15 and a speed stage of the transmission. The rotational speed being inputted to the transmission 15 is also the rotational speed being outputted from the torque converter 14. Accordingly, the sensor 22S is also a sensor which indirectly detects an output rotational speed of the torque converter 14.

A front wheel output rotational speed sensor 23S detects a rotational speed of one of the front wheels 18F as an electrical signal, which it inputs to the controller 2. Thus the controller 2 is able to obtain the current vehicle speed (the actual vehicle speed) on the basis of an effective radius of the tire, which is set in advance, and of the rotational speed of the front wheel. It should be understood that the configuration of sensors described above is only an example, and that the present invention is not limited to the structure shown above.

The controller 2 is built as an electronic circuit which may, for example, comprise a calculation section 20, a memory 21, a transmission control section 22, an I/O interface section 23. The calculation section 20 comprises a vehicle speed control section 20A and a standard traveling resistance correction section 200 (in the following, this is sometimes abbreviated as the "correction section"). The vehicle speed control section 20A is a function of exercising control so as to make the road speed of the wheel loader corresponding to the target vehicle speed which is set by a vehicle speed setting device 3. The correction section 20B is a function for correcting the traveling resistance which is considered as being standard according to the traveling environment and long term changes of the mechanical structure 1 and so on. A method of vehicle speed control, and a method of correcting it, will be described hereinafter. It should be understood that it is also possible to provide the calculation section 20 with other functions, as well as the functions 20A and 20B described above.

The memory 21 is a storage medium which, for example, may comprise programs 21A, parameters 21B, and tables 21O. The calculation section 20 implements vehicle speed control and correction to the traveling resistance by reading in a program 21A from the memory 21. The parameters 21B are set values of various types which are used for the vehicle speed control and for correcting the traveling resistance. And the tables 21C are maps of various types which are used for the vehicle speed control and for correcting the traveling resistance. An example of these parameters 21B and tables 21C will be described hereinafter with reference to FIG. 2.

The transmission control section 22 determines a speed stage according to driving operation by an operator and according to the vehicle speed, and outputs a control signal to the transmission 15. The selected speed stage is also inputted to the calculation section 20.

A I/O interface section 23 is a circuit for sending and receiving electrical signals to and from the various sensors 20S through 23S, the clutch 13, and the transmission 15. The calculation section 20 receives the detection signals from the various sensors 20S through 23S via the I/O interface section 23. Moreover, the calculation section 20 outputs a control signal to the clutch 13 via the I/O interface section 23. The transmission control section 22 also outputs its control signal to the transmission 15 via the I/O interface section 23. It should be understood that the structure of the controller 2 described above has been shown as simplified to a level necessary for understanding and implementation of the present invention, and the present invention is not limited to the structure described above.

Figure 2:
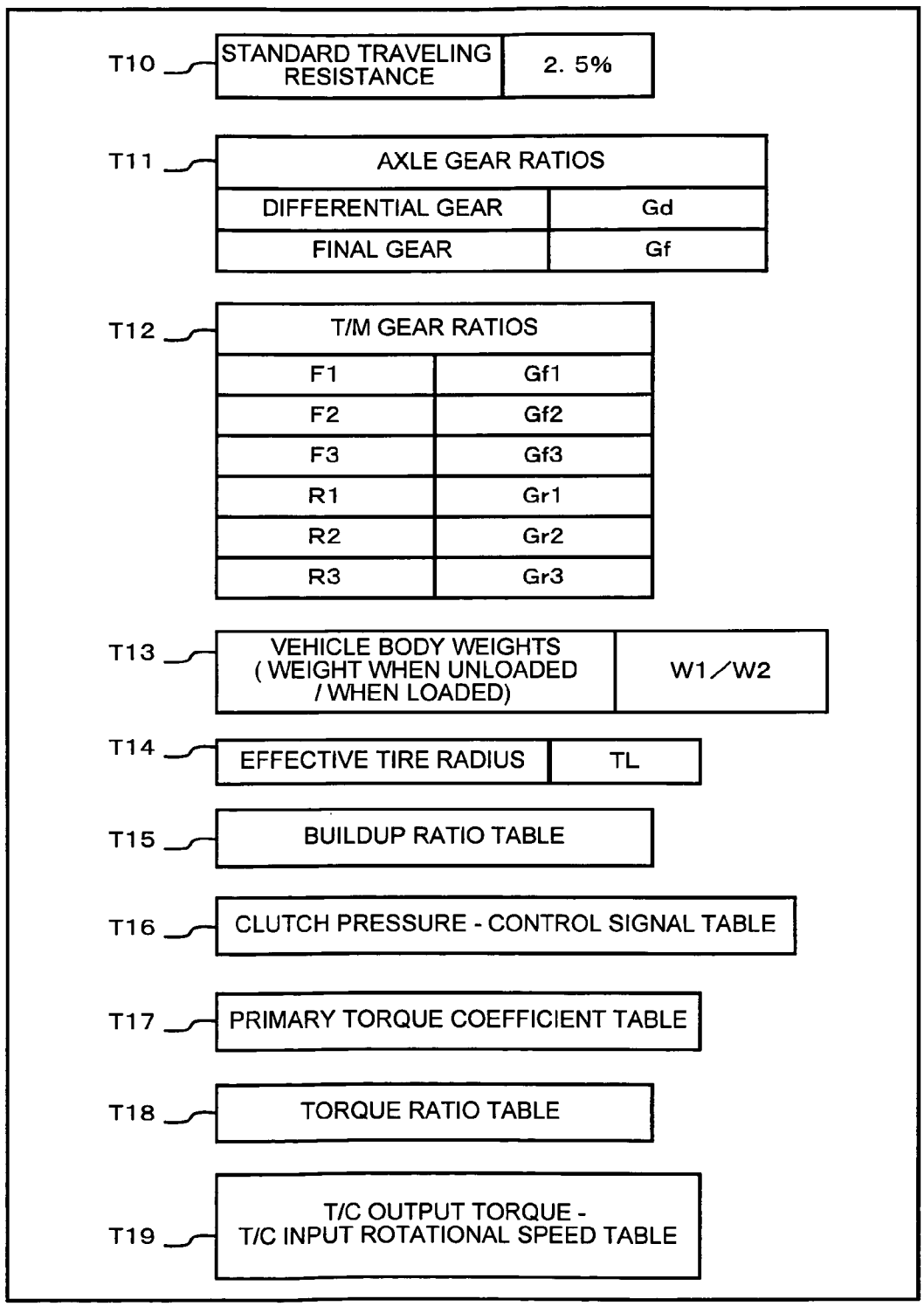
FIG. 2 is an explanatory figure showing the structure of parameters and tables stored in a memory.

FIG. 2 is an explanatory figure, schematically showing the structure of the parameters 21B and the tables 21O stored in the memory 21. In the following explanation, for convenience, no distinction will be made between parameters and tables: they will both be termed "tables".

A table T10 stores the value of the traveling resistance which is taken to be standard. The traveling resistance taken as being standard corresponds to the "standard traveling resistance" of the Claims. The value of the traveling resistance taken as being standard may, for example, be selected from the range from 1% through 4%. For example, it may be desirably selected from the range from 2% through 3%. In this embodiment, 2.5% is employed as the value of the standard traveling resistance. A comparatively large number of road surface states can be handled by setting the standard traveling resistance to 2.5%.

However, such selection of the value of the standard traveling resistance from the range 1% through 4%, or from the range 2% through 3%, and setting it to 2.5%, is not to be considered as exerting any influence upon the scope of rights granted for the present invention, except according to the description in the Claims. In other words, the scope of the present invention pertains to all working vehicles in which, using a standard traveling resistance, a target drive force is calculated which is considered to be required for constant speed traveling, and a clutch pressure is controlled so that the target drive force is obtained.

A table T11 stores gear ratios of the axles 17F and 17R. A table T12 stores gear ratios of the various speed stages of the transmission 15. In this embodiment, three speed stages are available for each of forward (F) and reverse (R). A table Tim stores the vehicle body weights of the wheel loader (hereinafter this is sometimes abbreviated as the "vehicle weight"). The vehicle weight (W1) in the unloaded state when no load is held in the bucket may be stored in the table T13. Moreover, the weight W2 of the load which can be held in the bucket may also be stored, in the table T13.

Accordingly, when no earth or sand or the like is loaded in the bucket, the vehicle weight of the wheel loader is W1, while, when earth or sand or the like is loaded in the bucket, the vehicle weight of the wheel loader is (W1+W2). In the case of a comparatively large size wheel loader, for example the vehicle weight (W1) when unloaded may be 210 t, while the vehicle weight (W1+W2) when loaded may be 250 t. If the difference is of this order, it will also be justifiable to calculate the necessary target drive force for constant speed traveling on the basis of the vehicle weight W1 when unloaded and the standard traveling resistance, irrespective of the presence or absence of a load. In particular, in this embodiment, as will be described hereinafter, since a means is provide for automatically correcting the standard traveling resistance according to the traveling environment and so on, accordingly it is possible to absorb more or less change in the vehicle weight by correcting the standard traveling resistance.

However, in a case such as that of a compact wheel loader when the difference between being unloaded or being loaded becomes great, or when attempting to implement stable traveling more accurately, it would also be acceptable to arrange to change over whether or not the vehicle weight W1 when unloaded is used, or whether or not the vehicle weight (W1+W2) when loaded is used, according to the presence or absence of a load.

A table T14 stores the effective radius TL of the tires 18F and 18R. A table T15 stores a buildup ratio which is used for vehicle speed control, as will be described hereinafter, By "buildup ratio" in this specification, is meant the amount of increase or decrease of the clutch pressure. A table T16 stores the values of control signals which correspond to various clutch pressures. A table T17 stores primary torque coefficients, T18 stores torque ratios. And T19 stores, for each output rotational speed of the torque converter 14, a relationship between the output torque of the torque converter 14 and the input rotational speed of the torque converter 14.

Figure 3:
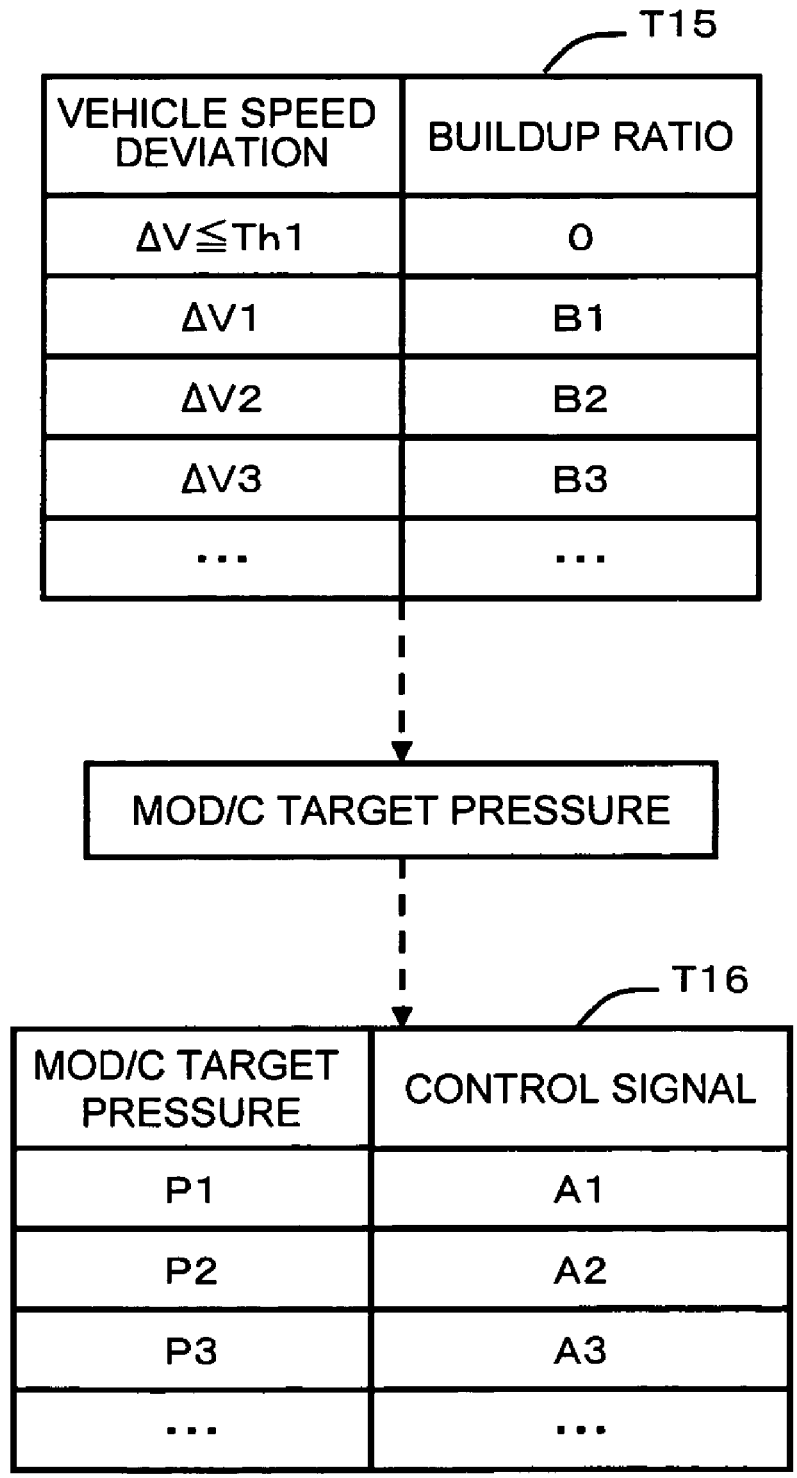
FIG. 3 is an explanatory figure showing both a table which gives a relationship between vehicle speed deviation and buildup ratio, and a table which gives a correspondence relationship between a target value for clutch pressure and a control signal.

FIG. 3 is an explanatory figure showing an example of the structures of the tables T15 and T16. For each difference ΔV between the target vehicle speed Vset and the actual vehicle speed Va (ΔV=|Vset−Va|), a corresponding buildup ratio is set in the table T15. If the deviation ΔV is less than or equal to a predetermined value Th1, then the buildup ratio is zero. The predetermined value Th1 is a threshold value for determination for changing over between control methods of two types, as will be described hereinafter. If the deviation ΔV is less than or equal to the predetermined value Th1, then, as a first control method, vehicle speed control is performed on the basis of the standard traveling resistance; while, if the deviation ΔV is greater than the predetermined value Th1, then, as a second control method, vehicle speed control is performed on the basis of the deviation ΔV.

Figure 4:
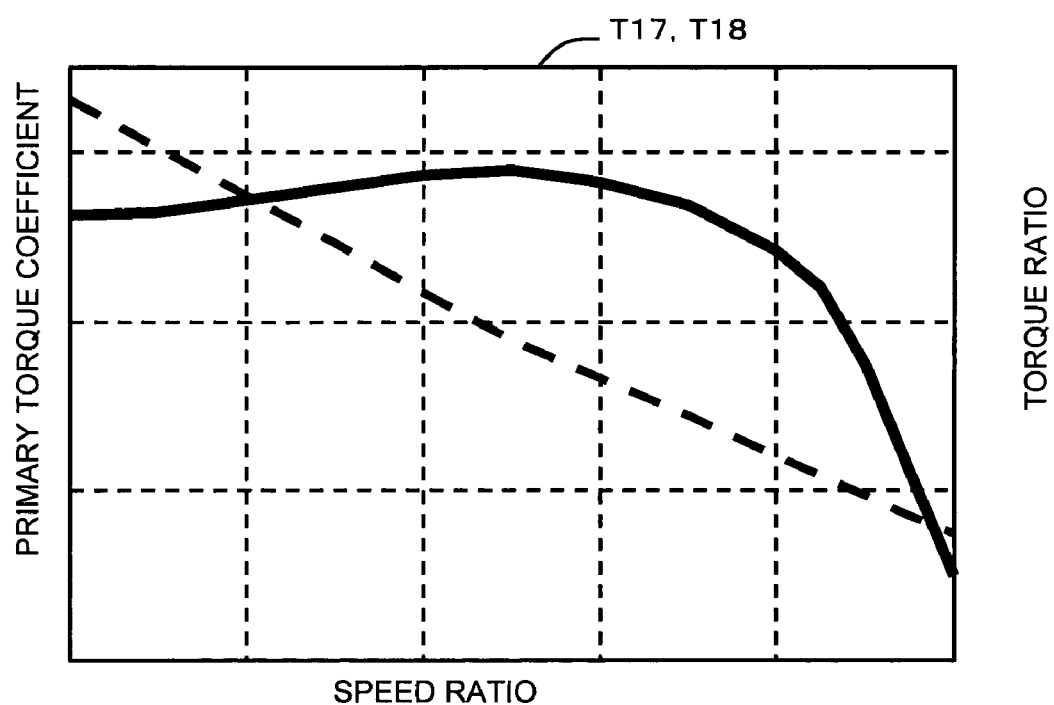
FIG. 4 is a graph showing both a correspondence relationship between primary torque coefficient and speed ratio, and a correspondence relationship between torque ratio and speed ratio.

FIG. 4 is an explanatory figure showing an example of the structures of the tables T17 and T18. The table T17 stores a correspondence relationship between speed ratio and primary torque coefficient. And the table T18 stores a correspondence relationship between speed ratio and torque ratio. The speed ratio is the ratio between the output rotational speed of the torque converter 14 and its input rotational speed. And the primary torque coefficients are an intrinsic coefficient related to the performance of the torque converter 14. Moreover, the torque ratio is the ratio between the output torque of the torque converter 14 and its input torque.

Figure 5:
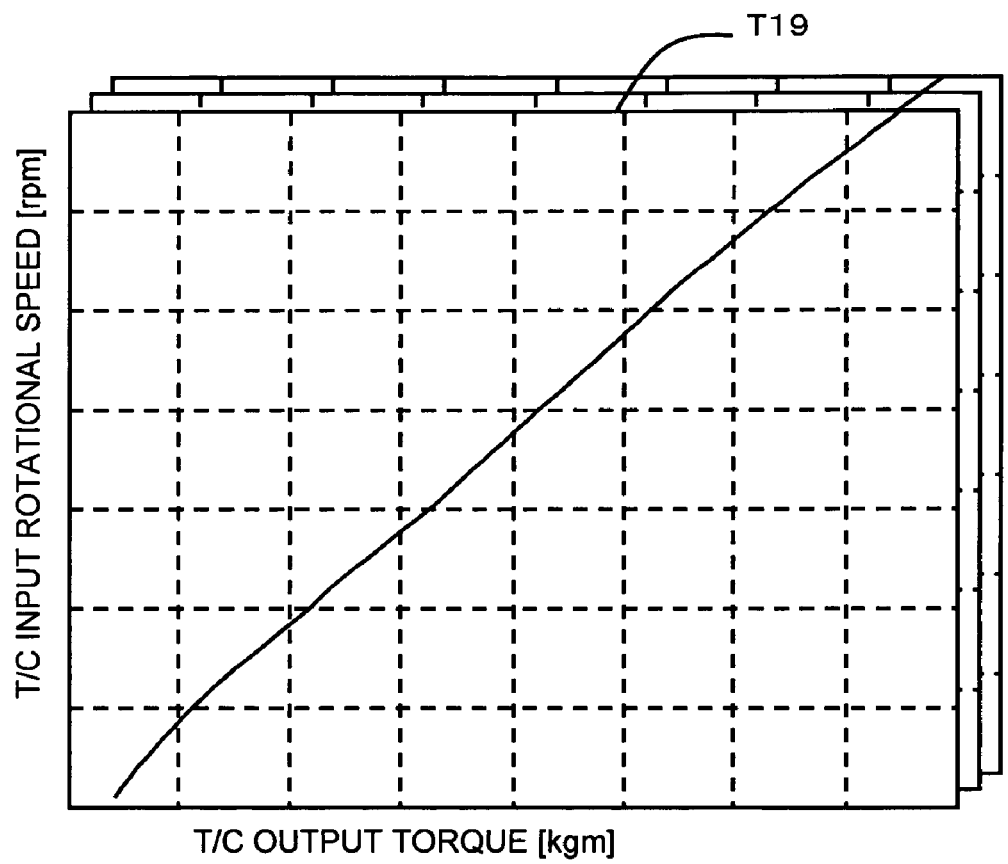
FIG. 5 is a graph showing a relationship between the rotational speed inputted to a torque converter, and the torque outputted from the torque converter.

FIG. 5 is an explanatory figure showing an example of the structure of the tables T19. For each of a number of output rotational speeds of the torque converter 14, the table T19 stores a correspondence relationship between the rotational speed inputted to the torque converter 14 and the torque outputted from the torque converter 14. Accordingly, it is possible to select the table T19 to be used by obtaining the output rotational speed of the torque converter 14. And it is possible to obtain the input rotational speed for obtaining the output torque from the torque converter 14, on the basis of the output torque of the torque converter 14 which is obtained from the target drive force, and of the table T19.

Figure 6:
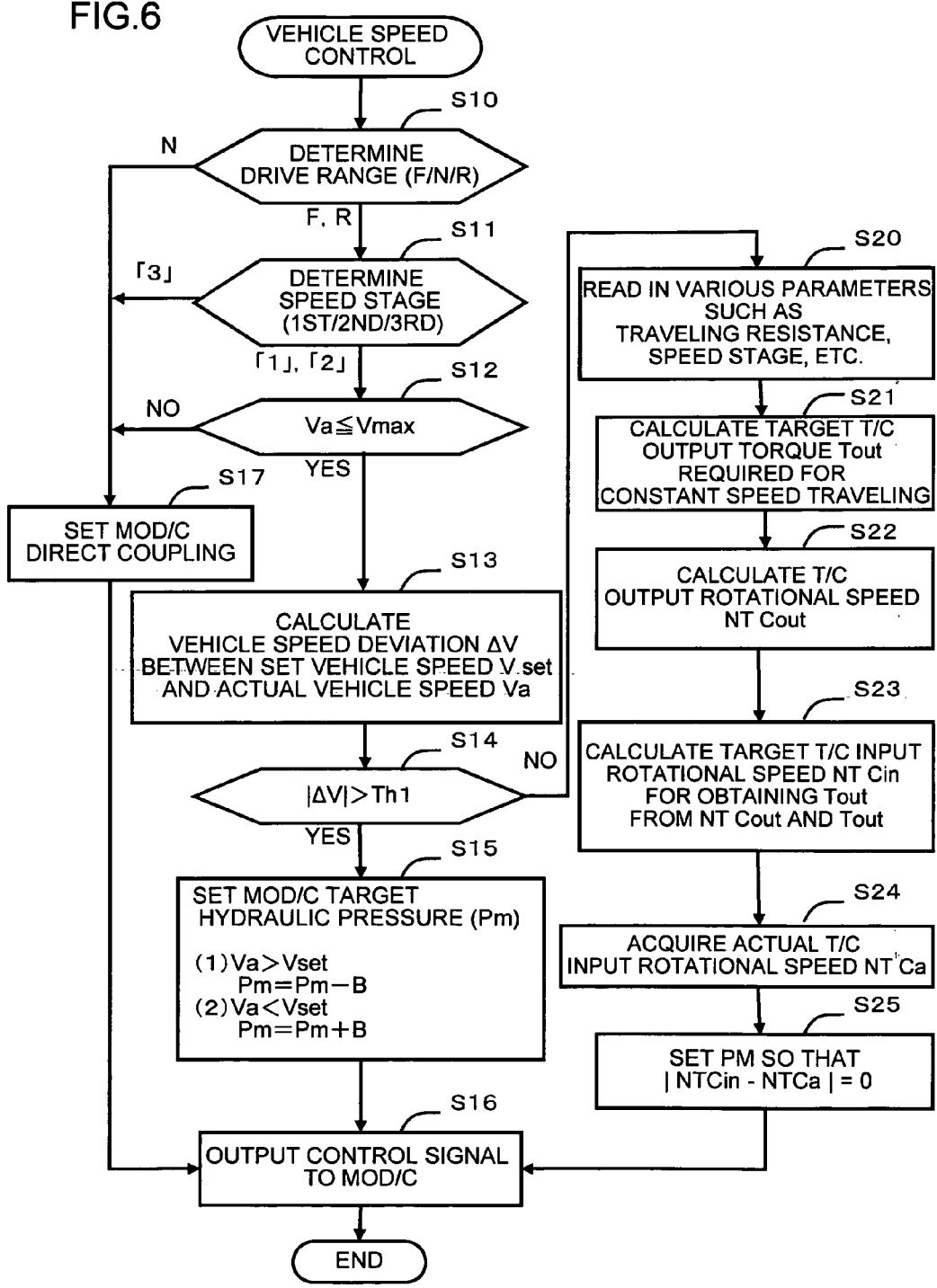
FIG. 6 is an overall flow chart showing vehicle speed control.

FIG. 6 is an overall flow chart showing processing for vehicle speed control. As is also the case with the various flow charts described subsequently, each of these flow charts shows only that outline of various processing steps to the extent which is necessary for understanding and implementation of the present invention. Accordingly, for a person skilled in the art, the sequence of these steps may be changed, or one step may be changed into another step or the like, provided that there is no departure from the scope of the present invention.

The controller 2 determines to which of forward (F), neutral (N), or reverse (R) the drive range is currently set (a step S10). If the drive range is set to forward or to reverse, then the controller 2 determines to which of first speed, second speed, or third speed the speed stage is currently set (a step S11). In this embodiment, if the speed stage is currently set to first speed or to second speed, then the controller 2 makes a determination as to whether or not the current vehicle speed Va is less than or equal to a maximum vehicle speed Vmax set in advance (a step S12).

If the current vehicle speed Va is less than or equal to the maximum vehicle speed Vmax (YES in the step S12), then the controller 2 calculates the deviation ΔV between the set vehicle speed that is set by the vehicle speed setting device 3 (i.e. the target vehicle speed) and the actual vehicle speed Va (a step S13), and makes a determination as to whether or not the deviation ΔV is greater than a predetermined value Th1 (a step S14), And, if the absolute value of the deviation ΔV is less than or equal to the predetermined value Th1 (NO in the step then the controller 2 sets the clutch pressure on the basis of a first control method which will be described hereinafter with reference to steps S20 through S25. But, if the absolute value of the deviation ΔV is greater than the predetermined value Th1 (YES in the step S14), then the controller 2 sets the clutch pressure on the basis of a second control method described in a step S15.

The second control method in the step S15 will be explained first. (1) If the actual vehicle speed Va is greater than the set vehicle speed Vset, then the controller 2 reduces the value of the target clutch pressure Pm which was set the time before by lust the buildup ratio B corresponding to the deviation ΔV (Pm=Pm−B). (2) If the actual, vehicle speed Va is less than the set vehicle speed Vset, then the controller 2 increases the value of the target clutch pressure Pm which was set the time before by just the buildup ratio B corresponding to the deviation ΔV (Pm=Pm+B). And the controller 2 reads out the control signal value corresponding to the target clutch pressure Pm which has been thus set from the table T16, and outputs the control signal to the clutch 13 (a step S16).

Moreover, in this embodiment, if the drive range is neutral, or if the current speed stage is the third speed stage, or if the actual vehicle speed Va is greater than the maximum vehicle speed Vmax, then the controller 2 sets the target clutch pressure so that the clutch 13 is directly coupled (a step S17).

Now, the first control method will be explained. If the absolute value of the deviation ΔV is less than or equal to the predetermined value Th1 (NO in the step S14), then the controller 2 reads in the values of various parameters which are used in vehicle speed control, such as the standard traveling resistance, the speed stage, the vehicle weight, and so on (a step S20). On the basis of these various parameters, the controller 2 calculates the value Tout of the torque to be outputted from the torque converter 14 for implementing constant speed traveling a step S21), and also calculates the current output rotational speed NTCout of the torque converter 14 on the basis of the signal from the sensor 223 (a step S22).

And, using the tables T19, the controller 2 calculates (a step S23) the rotational speed NTCin which must be inputted to the torque converter 14, so as to obtain, the target output torque Tout. Moreover, on the basis of the signal from the sensor 21S, the controller 2 detects the actual input rotational speed NTCa being inputted to the torque converter 14 (a step S24). The controller 2 then sets the target value Pm for the clutch pressure so that the absolute value |NTCin−NTCa| of the difference between the target input rotational speed NTCin and the actual input rotational speed NTCa becomes zero (a step S25). And the controller 2 outputs a control signal to the clutch 13 for implementing the clutch pressure Pm which has thus been set (the step S16).

Figure 7:
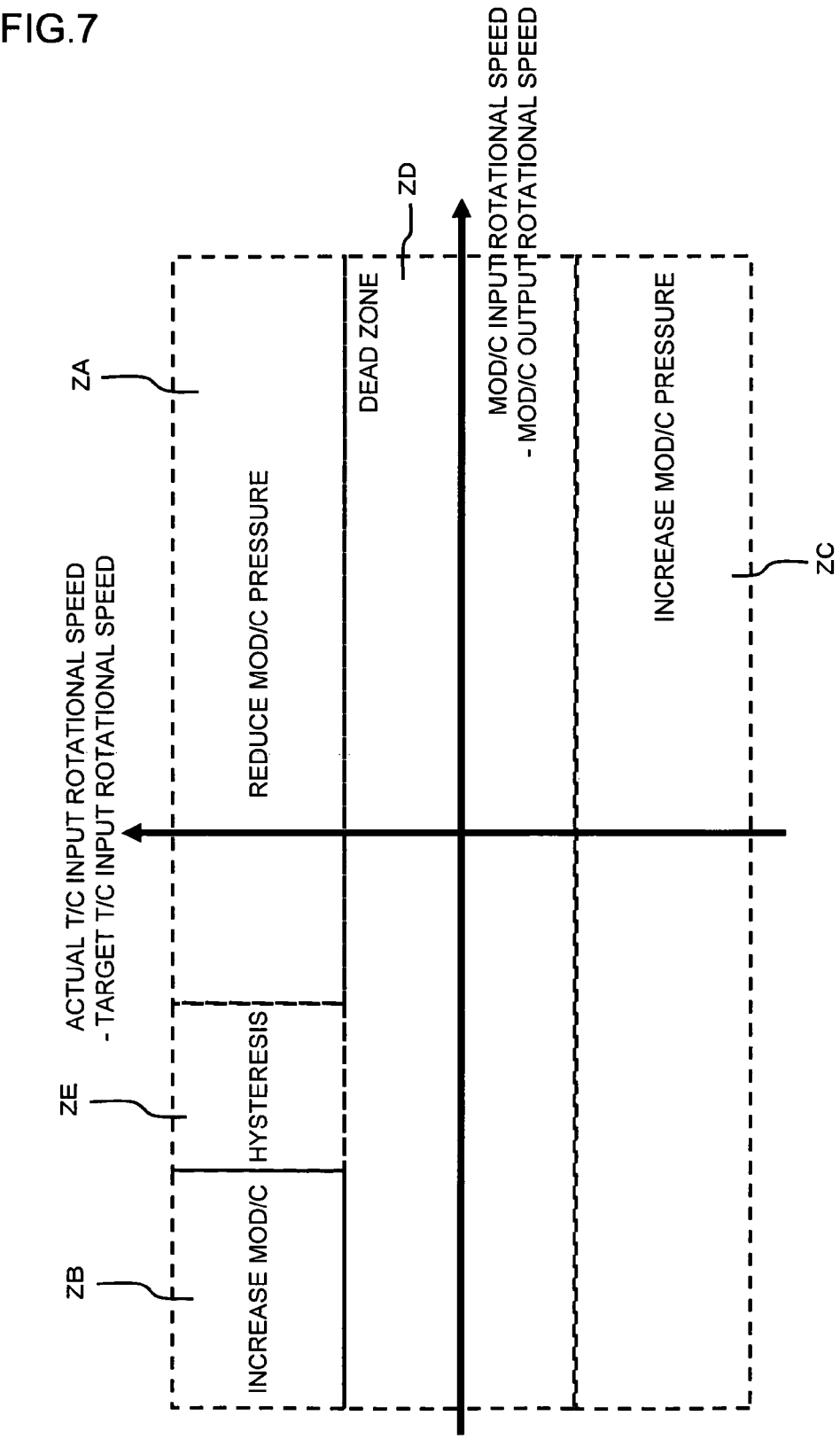
FIG. 7 is an explanatory figure showing the state of vehicle speed control.

FIG. 7 is an explanatory figure showing the state of control for the clutch pressure according to the first control method. The vertical axis in FIG. 7 gives the difference between the actual rotational speed NTCa inputted to the torque converter 14 and the target input rotational speed NTCin, while the horizontal axis in FIG. 7 gives the difference between the actual rotational speed inputted to the clutch 13 and the rotational speed outputted from the clutch 13. The actual rotational speed inputted to the clutch 13 corresponds to the engine rotational speed. And the actual rotational speed outputted from the clutch 13 corresponds to the rotational speed inputted to the torque converter 14. The regions ZA and ZB which are positioned in the upper portion of FIG. 7 are regions where the vehicle behavior is an state of acceleration, while the region ZC in the lower portion of FIG. 7 is a region in which the vehicle behavior is a state of deceleration.

The first region ZA is a region in which the actual input rotational speed NTCa is greater than the target input rotational speed NTCin, and moreover the input rotational speed of the clutch 13 is large. In this region ZA, the controller 2 decreases the actual input rotational speed NTCa by decreasing the clutch pressure and causing the clutch 13 to slip, so that the difference between the rotational speed NTCa inputted to the torque converter 14 and the target input rotational speed NTCin becomes smaller.

The second region ZB is a region in which the actual input rotational speed NTCa is greater than the target input rotational speed NTCin, and moreover the input rotational speed of the clutch 13 is small in this region ZB, the controller 2 decreases the actual input rotational speed NTCa by raising the clutch pressure, thus establishing a state in which engine braking is effective.

The third region ZC is a region in which the actual input rotational speed NTCa is lower than the target input rotational speed NTCin. Thus, the controller 2 increases the actual input rotational speed NTCa by raising the clutch pressure.

The region ZD which is positioned at the central portion of FIG. 7 is a dead zone. The width of ID may for example, be set to about ±10 rpm. In other words, if the deviation ΔV between the actual vehicle speed Va and the set vehicle speed Vset is within 10 rpm, then the controller 2 does not change the clutch pressure.

The region ZE at the upper left portion of FIG. 7 is a hysteresis region. Upon transition from the region ZA to the region ZE, the operation continues just as it was in the region ZA. Conversely, upon transition from the region ZE to the region ZE, the operation continues just as it was in the region ZB. And, upon transition from the region ZA through this hysteresis region ZE to the region ZB, the operation is performed as for the region ZB. Conversely, upon transition from the region ZB through the hysteresis region ZE to the region ZA, the operation is performed as for the region ZA.

FIGS. 8 through 12 are graphs showing simulation of the results of vehicle speed control according to this embodiment, as the value of the actual traveling resistance is changed. Change over time of the clutch pressure is shown in upper portions of FIGS. 8 through 12, while change over time of the actual vehicle speed is shown in lower portions of FIGS. 8 through 12.

Figure 8:
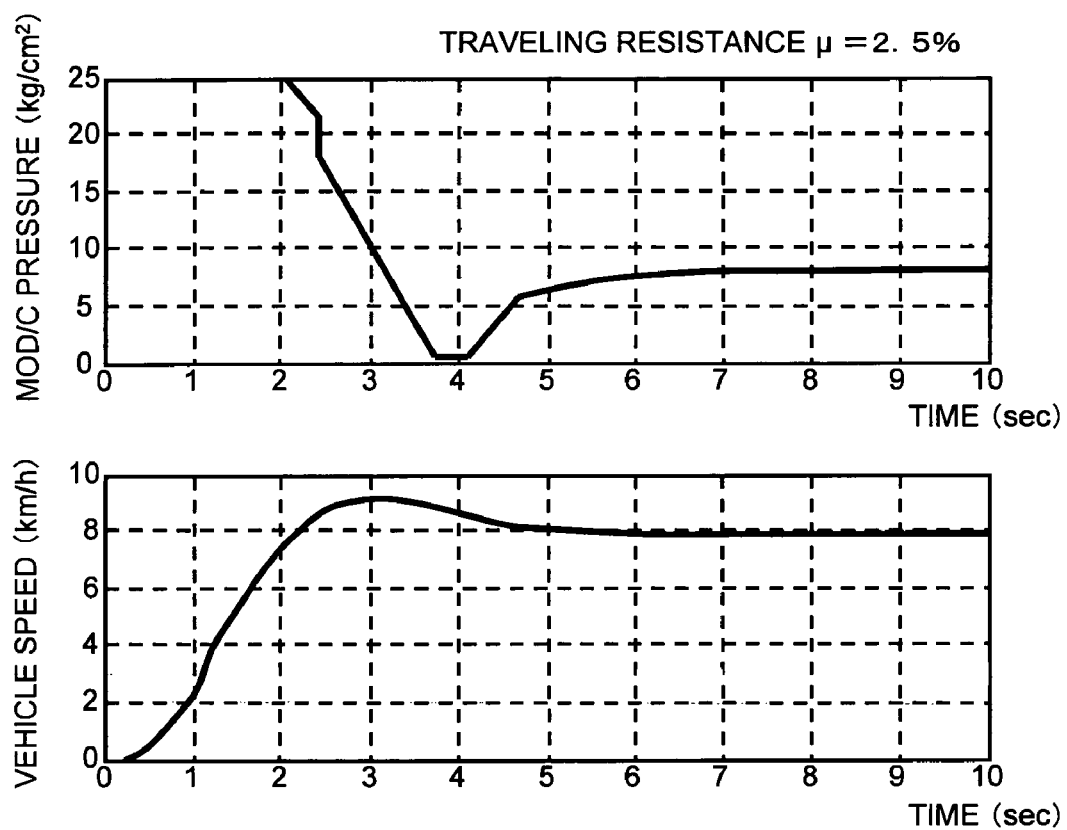
FIG. 8 is a graph showing the results of simulation when the road resistance is 2%.

FIG. 8 shows a case when the actual traveling resistance is 2.5%, which is a case in which the standard traveling resistance and the actual traveling resistance are the same. In this case, as shown in the figure, constant speed traveling is attained after around four seconds has elapsed.

Figure 9:
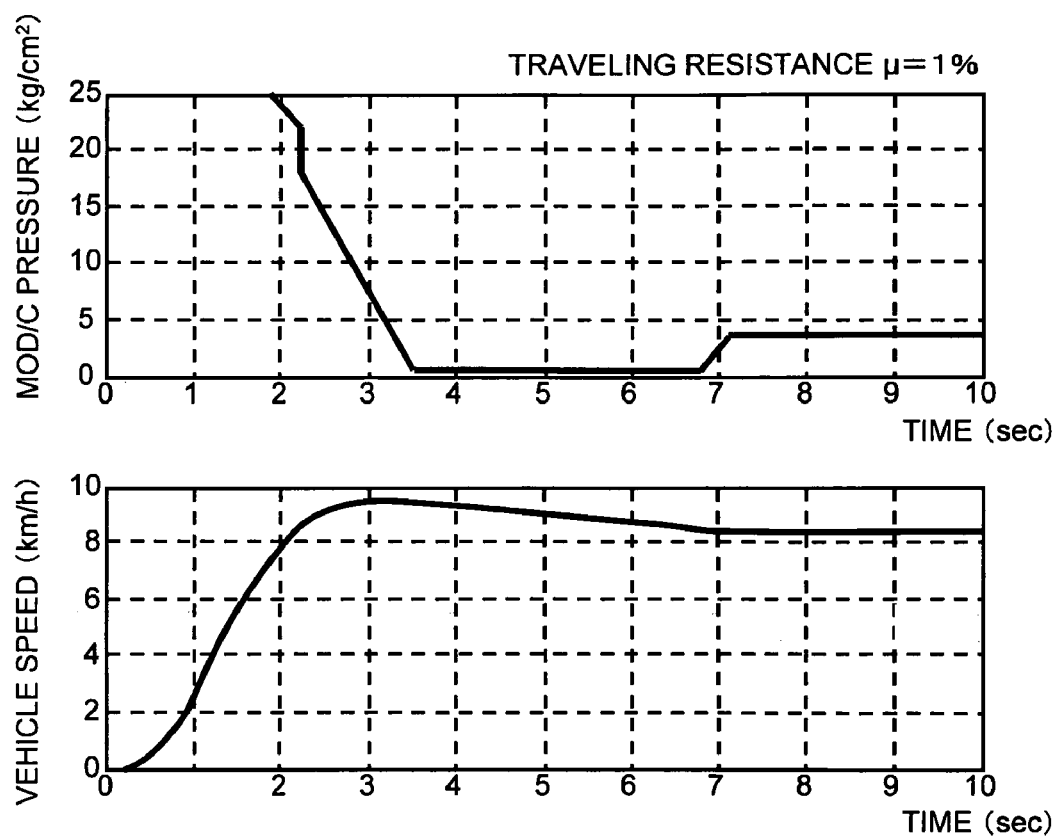
FIG. 9 is a graph showing the results of simulation when the road resistance is 1%.

FIG. 9 shows a case when the actual traveling resistance is 1%. In this case, as shown in the figure, constant speed traveling is attained after around seven seconds has elapsed.

Figure 10:
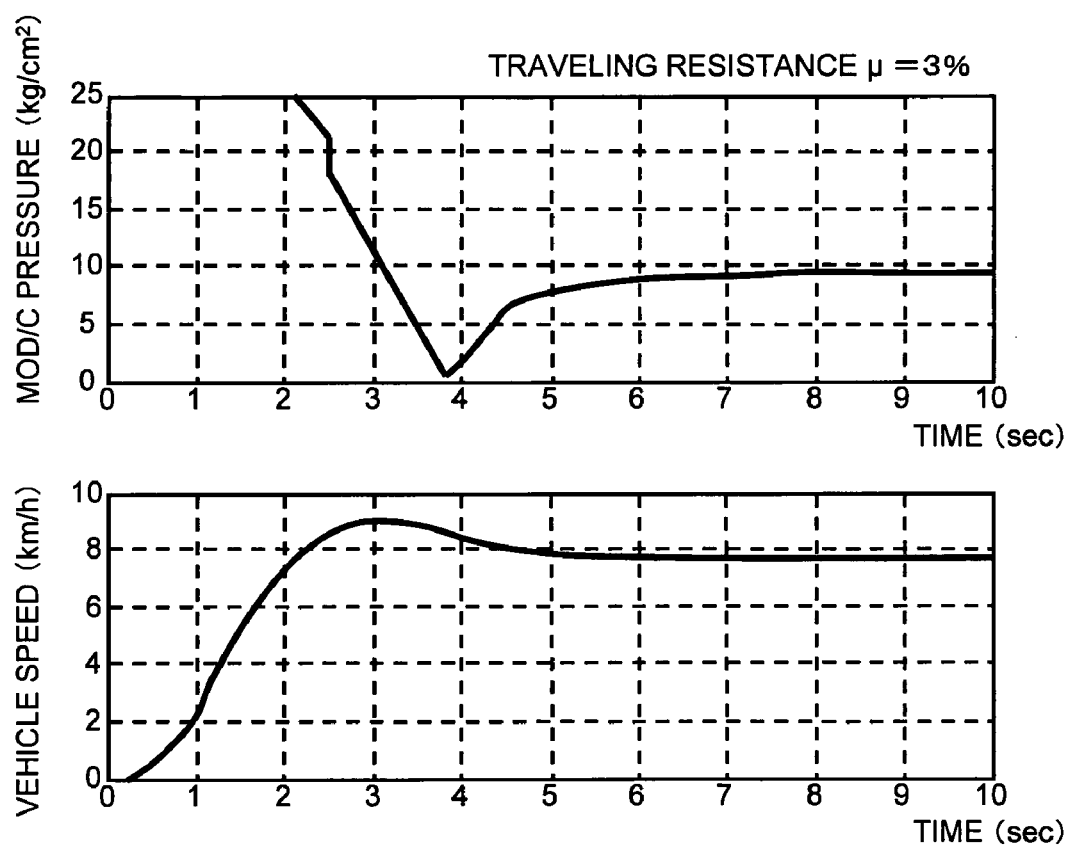
FIG. 10 is a graph showing the results of simulation when the road resistance is 3%.

FIG. 10 shows a case when the actual traveling resistance is 3%. In this case, as shown in the figure, constant speed traveling is attained after around four seconds has elapsed.

Figure 11:
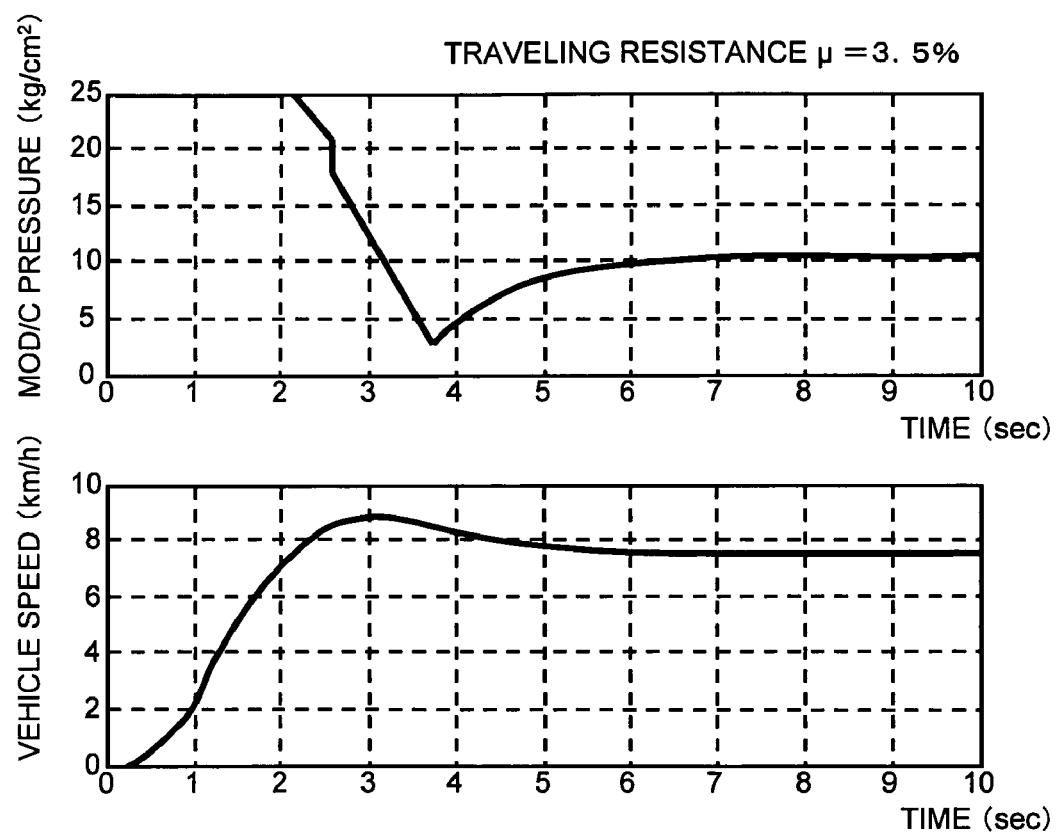
FIG. 11 is a graph showing the results of simulation when the road resistance is 3.5%.

FIG. 11 shows a case when the actual traveling resistance is 3.5%. In this case, as shown in the figure, constant speed traveling is attained after around four seconds has elapsed.

Figure 12:
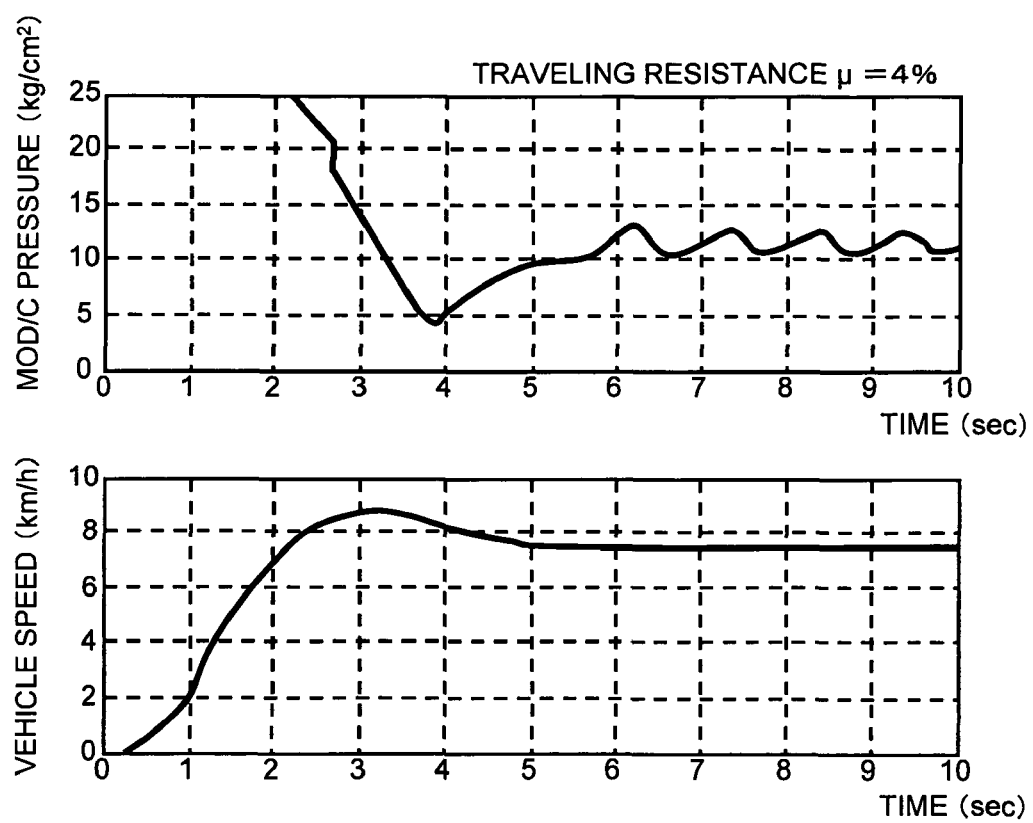
FIG. 12 is a graph showing the results of simulation when the road resistance is 4%.

FIG. 12 shows a case when the actual traveling resistance is 4%. In this case, as shown in the figure, constant speed traveling is attained after around four seconds has elapsed. However, since the difference between the standard traveling resistance and the actual traveling resistance is large, accordingly, as shown in the upper portion of FIG. 12, a hunting phenomenon appears in the clutch pressure. It is considered that, due to this hunting phenomenon, there is a possibility of decrease of the life of components of the hydraulic system or the like.

Accordingly, if the standard traveling resistance is set to 2.5%, it is not desirable to work in a workplace where the actual traveling resistance is 4% or greater. However in this embodiment, as will be described hereinafter, it is possible to deal even with this situation in an appropriate manner, since a function is provided of automatically adjusting the standard traveling resistance to the actual traveling environment.

Figure 13:
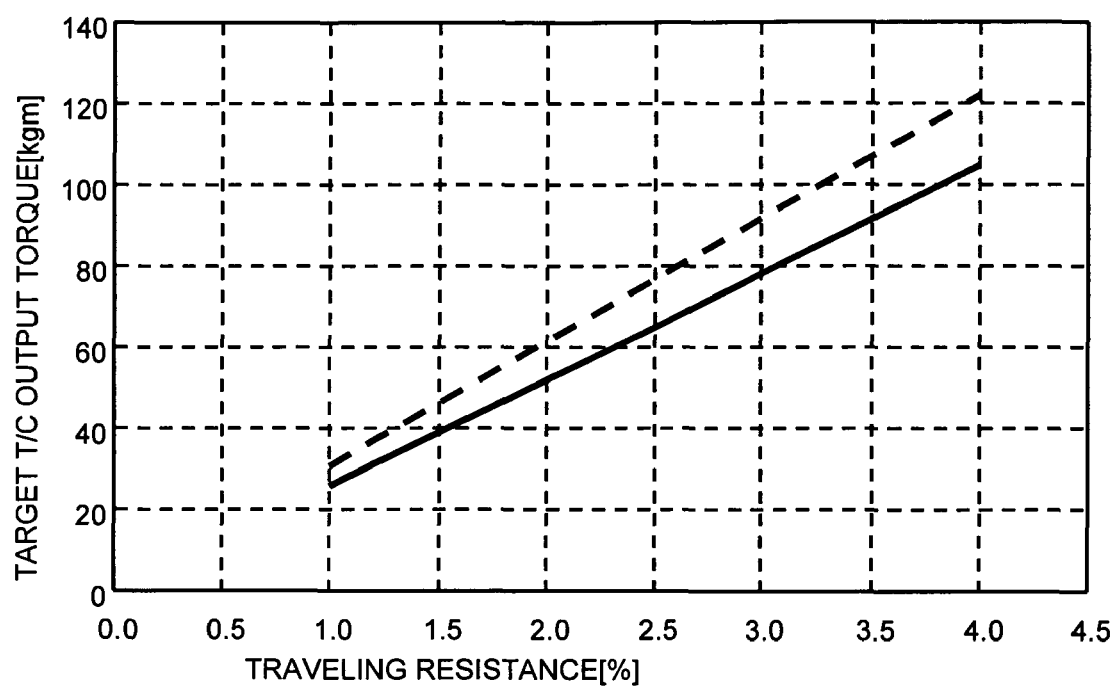
FIG. 13 is a graph showing a relationship between traveling resistance and target drive force.

FIG. 13 is a graph showing the correspondence relationship between the traveling resistance and the target output torque Tout of the torque converter 14. The dotted line in FIG. 13 shows a case when the vehicle is loaded, while the solid line shows a case when it is not loaded. The more the traveling resistance increases, the more does the value of the target output torque necessary for constant speed traveling also increase. Moreover, the target output torque needed for constant speed traveling is greater when the vehicle is loaded, than when it is not loaded.

Figure 15:
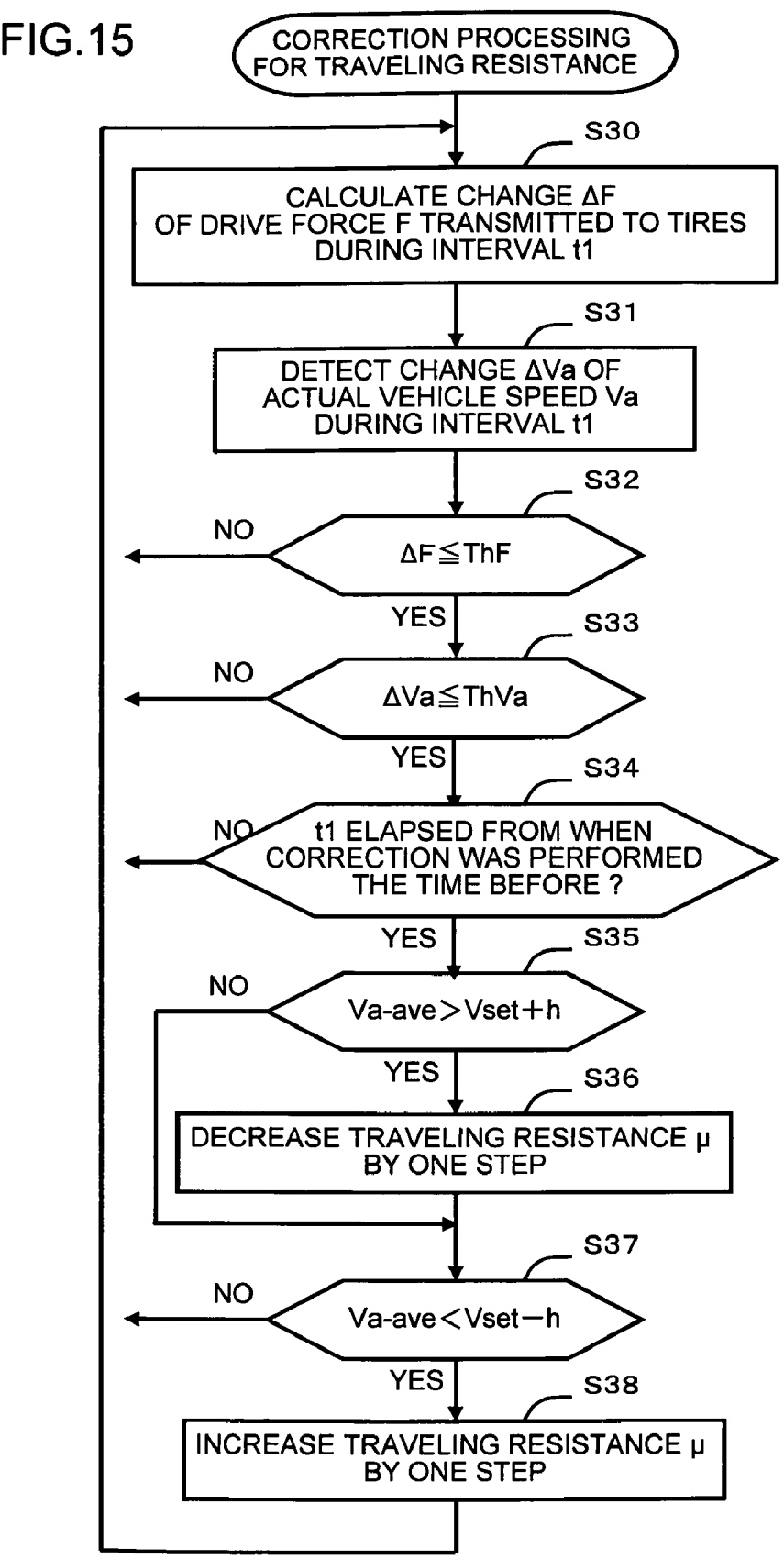
FIG. 15 is a flow chart showing first correction processing for correcting the standard traveling resistance.

The method for automatically correcting the standard traveling resistance will now be explained with reference to FIGS. 14 through 16. FIG. 14 is a graph showing the condition for starting to correct the standard traveling resistance. And FIG. 15 is a flow chart showing processing for correcting the standard traveling resistance. The correction processing shown in FIG. 15 will now be explained with reference to FIG. 14.

During an interval t1 set in advance, the controller 2 calculates the change ΔF of the drive force F transmitted to the tires (a step S30). This interval t1 may, for example, be set to 3 seconds. Next, during the interval t1, the controller 2 detects the change ΔVa of the actual vehicle speed Va (a step S31).

Then the controller 2 makes a determination as to whether or not the drive force change ΔF is less than or equal to a threshold value ThF set in advance (a step S32). If the drive force change ΔF is less than or equal to the threshold value ThF (YES in the step S32), then the controller 2 makes a determination as to whether or not the vehicle speed change ΔVa is less than or equal to a threshold value ThVa set in advance (a step S33). If the vehicle speed change ΔVa is less than or equal to the threshold value ThVa (YES in the step S33), then the controller 2 makes a determination as to whether or not the interval t1 or greater has elapsed from when correction was performed the previous time (a step S34). If the interval t1 or long is elapsed from when correction was performed the previous time (YES in the step S34), then correction of the traveling resistance is performed as described below (steps S35 through S38).

If the drive force change ΔF is greater than the threshold value ThF (NO in the step S32), or if the vehicle speed change ΔVa is greater than the threshold value ThVa (NO in the step S33), or if the interval t1 has not elapsed from when correction was performed the previous time (NO in the step S34), then the flow of control returns to the step S30, since the condition for starting correction is not satisfied.

In this embodiment, the correction processing is started if in a stabilized state the standard traveling resistance needs to be corrected, and if the drive force change ΔF and the vehicle speed change ΔVa fall within fixed ranges. Moreover, in this embodiment, correction processing is only started if at least the interval t1 has elapsed from when correction was performed the previous time, so as to prevent such correction processing from being performed continuously.

The controller 2 compares the average vehicle speed Va-ave in the interval t1 and the value (Vset+h) resulting from adding a hysteresis h to the set vehicle speed Vset. If Va-ave is greater than Vset+h (YES in the step S35), then the controller 2 decreases the value of the standard traveling resistance by one step (a step S36). But, if Va-ave is less than Vset+h (YES in the step S37), then the controller 2 increases the value of the standard traveling resistance by one step (a step S38). In this case, although the drive force and the speed are both stable, the set vehicle speed and the average vehicle speed are not equal to one another. This means that the value of the drive force is not correct for attaining the set speed. Thus, in this embodiment, the value of the standard traveling resistance is changed, and is corrected to the necessary value for the drive force.

In this embodiment, one step is set to 0.5%. Accordingly, when the standard traveling resistance of 2.5% is decreased by one step, it becomes 2%, while when it is increased by one step, it becomes 3%. It should be understood that, in this embodiment, an upper limit value for the traveling resistance is set to 4%, and a lower limit value for the traveling resistance is set to 2%. The standard traveling resistance is corrected within this range from the upper limit value to the lower limit value.

Figure 16:
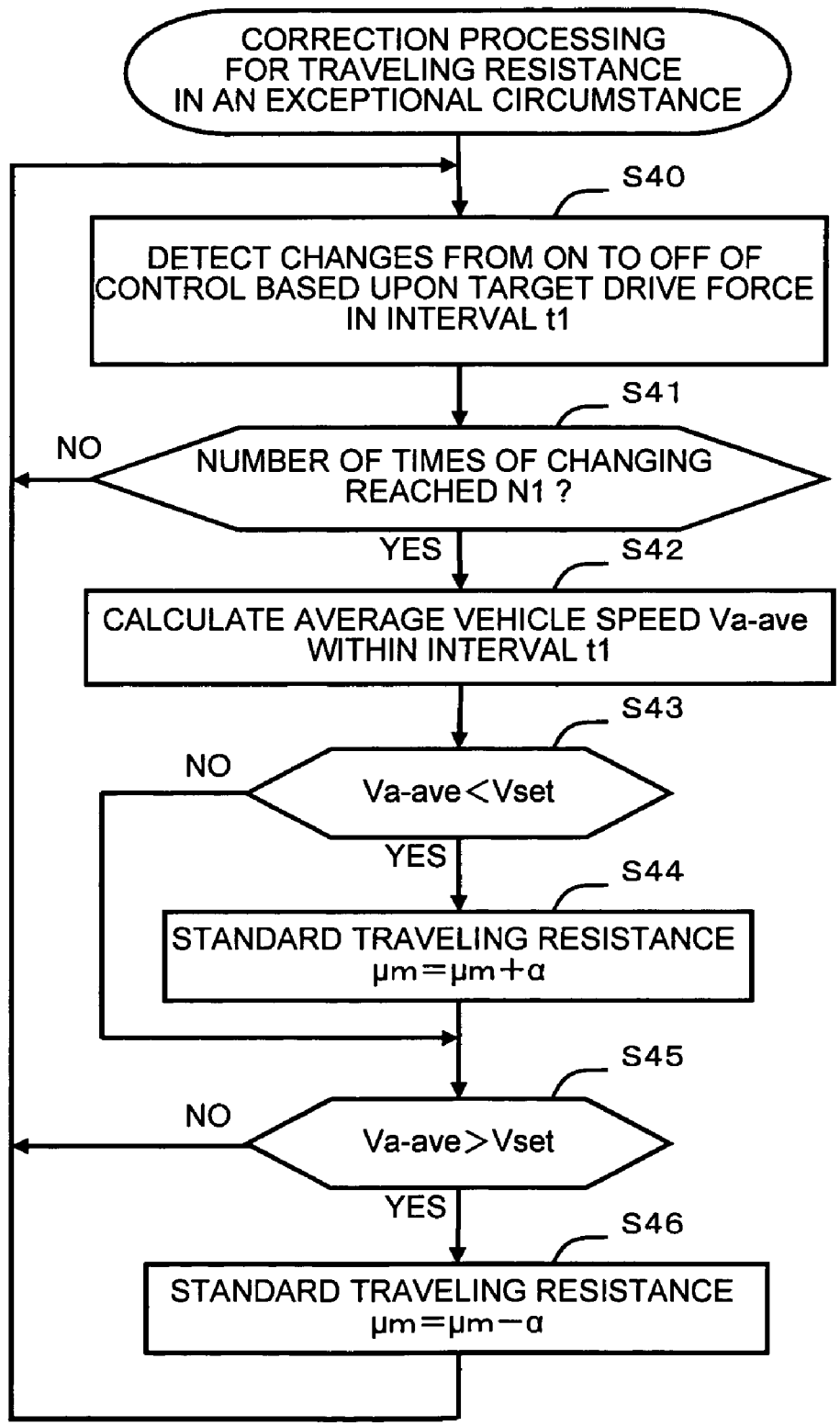
FIG. 16 is a flow chart showing second correction processing for correcting the standard traveling resistance in an exceptional circumstance.

FIG. 16 is a flow chart showing correction processing for correction of the standard traveling resistance in an exceptional circumstance, such as when the phenomenon of hunting is taking place. For example when, as shown in FIG. 12, a wheel loader for which the standard traveling resistance is set to 2.5% is used in a working location in which the actual traveling resistance is 4%, then the hunting phenomenon appears. In this case the correction processing shown in FIG. 15 cannot be started, since the change ΔF of the drive force does not fall within the range of the threshold value ThF.

Thus, in this embodiment, second correction processing is provided for correcting the standard traveling resistance even in this type of exceptional circumstance.

The controller 2 detects a number of times of execution, within the interval t1 set in advance, of vehicle speed control on the basis of a target drive force which has been calculated from the traveling resistance (the first control method) (a step S40). Here, reference is made to FIG. 6. As described above, if the absolute value $|\Delta V|$ of the vehicle speed deviation is less than or equal to the predetermined value Th1, then the first control method of the steps S20 through S25 is performed, while, if $|\Delta V|$ is greater than the predetermined value Th1, then the second control method of the step S15 is performed. If the execution of the first control method is termed an ON state of the first control method, while the execution of the second control method instead of the first control method is termed an OFF state of the first control method, then the controller 2 detects the number of times in the interval t1 that the first control method changes from its ON state to its OFF state (the step S40).

The controller 2 then makes a determination as to whether or not the number of times of changing has reached at a predetermined number of times N1 set in advance (a step S41). N1 may, for example, be set to 3. If the number of times of changing has reached N1 (YES in the step S41), then the controller 2 calculates the average vehicle speed Va-ave in the interval t1 (a step S42). And, if this average vehicle speed Va-ave is less than the set vehicle speed Vset (YES in a step S43), then the controller 2 increases the value of the standard traveling resistance by just a predetermined value α (a step S44). Conversely, if the average vehicle speed Va-ave is greater than the set vehicle speed Vset (YES in a step S45), then the controller 2 decreases the value of the standard traveling resistance by just a predetermined value α (a step S46).

Here, the predetermined value α may be, for example, set to 0.5%. Accordingly, in another manner, it may also be said that in the step S44 the standard traveling resistance is increased by just one step, while in the step S45 the standard traveling resistance is decreased by just one step. Conversely, in another manner, it may also be said that in the step S36 of FIG. 16 the standard traveling resistance is decreased by just a predetermined value, while in the step S38 the standard traveling resistance is increased by just a predetermined value.

According to this embodiment having the structure described above, the following advantages may be obtained. In this embodiment, the target drive force required for constant speed traveling is calculated on the basis of the standard traveling resistance, and the clutch pressure is controlled so that the target drive force is obtained. Accordingly, as compared to a case of controlling the clutch pressure on the basis of deviation of the vehicle speed, it is possible to implement constant speed traveling in a more stable manner, and to improve the driving feeling.

Since in this embodiment the traveling resistance is automatically corrected on the basis of deviation of the vehicle speed, accordingly it is possible to deal with changes in the traveling environment and long term changes in tires or other components and so on by involving these changes in the value of the standard traveling resistance, so that it is possible to implement highly robust control.

In this embodiment, the first control method in which the clutch pressure is controlled on the basis of the target drive force and the second control method in which the clutch pressure is controlled on the basis of deviation of the vehicle speed are combined, and, in condition that, the second control method is not executed ($|\Delta V| \leq Th1$) but rather the first control method is executed. Accordingly it is possible subsequently to add a portion for the first control method to a controller to which only the second control method is provided, in a comparatively simple manner.

In this embodiment, since the first control method and the second control method are combined, it is possible for a large vehicle speed deviation $\Delta V$ to be suppressed by the second control method, while a small vehicle speed deviation $\Delta V$ is suppressed by the first control method. Accordingly, even if it is not possible to suppress a vehicle speed deviation $\Delta V$ with the first control method, for example due to an abrupt change of the state of the road surface or the like, then it is still possible to adjust the vehicle speed by the second control method.

In this embodiment, in an exceptional circumstance in which it is not possible to execute the first correction processing, then the second correction processing is executed, so as to correct the standard traveling resistance. Accordingly, it is possible to respond in an appropriate manner even to abrupt changes of the traveling environment.

Embodiment Two

A second embodiment will now be explained on the basis of FIGS. 17 and 18. It should be understood that the embodiments described below correspond to variants of the first embodiment. Accordingly, the explanation will focus upon the points of difference from the first embodiment. In this embodiment, the vehicle speed is controlled by performing only the first control method.

Figure 17:
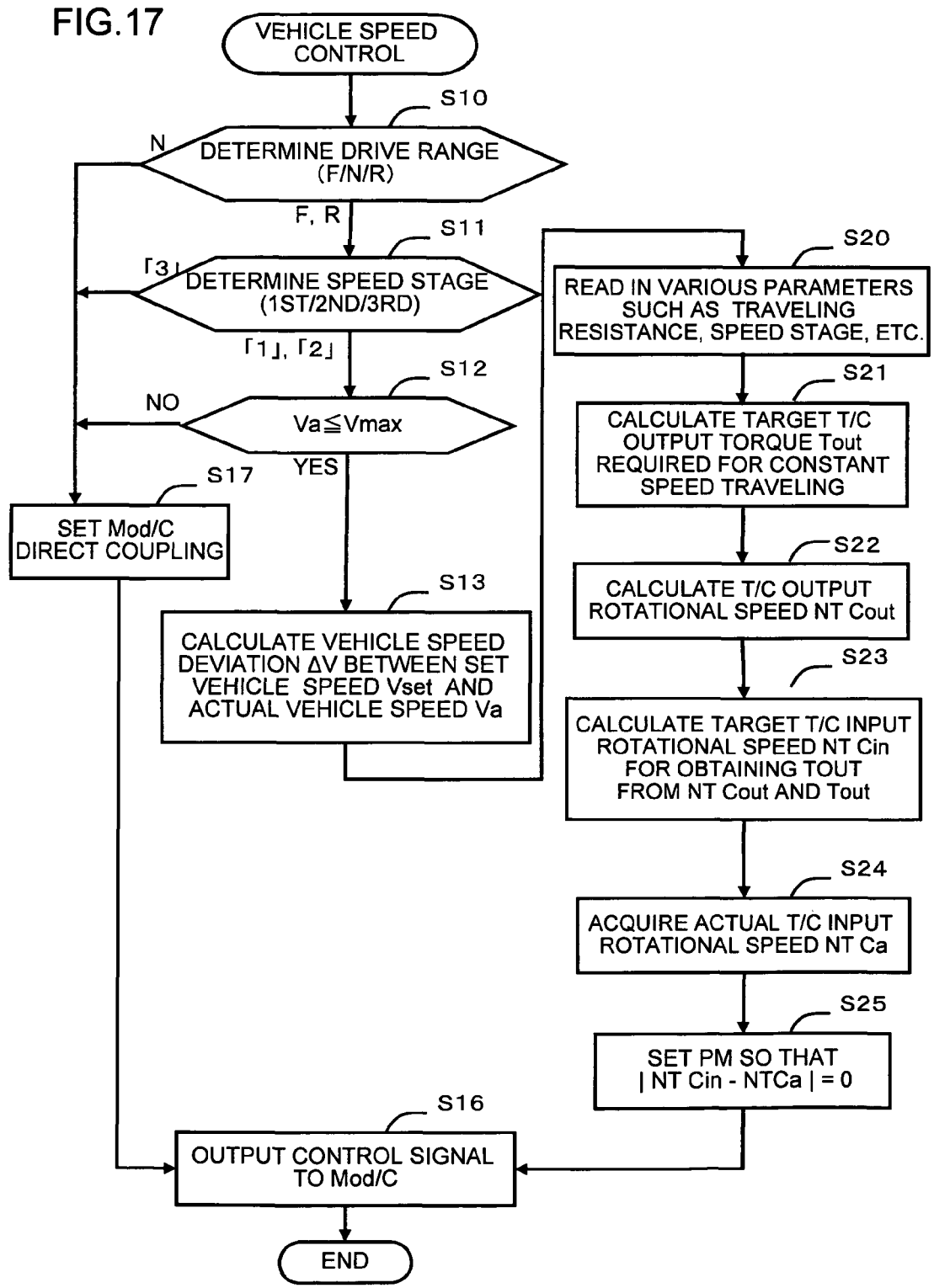
FIG. 17 is a flow chart of vehicle speed control according to a second embodiment.

FIG. 17 is a flow chart of the vehicle speed control procedure according to this embodiment. In FIG. 17, among the steps S10 through S25 described with reference to FIG. 6, all of the steps are provided except for the steps S14 and S15, which are eliminated. In other words, in this embodiment, the second control method (S15 in FIG. 6) is not performed, and only the first control method (of the steps S20 through S25) is implemented.

Figure 18:
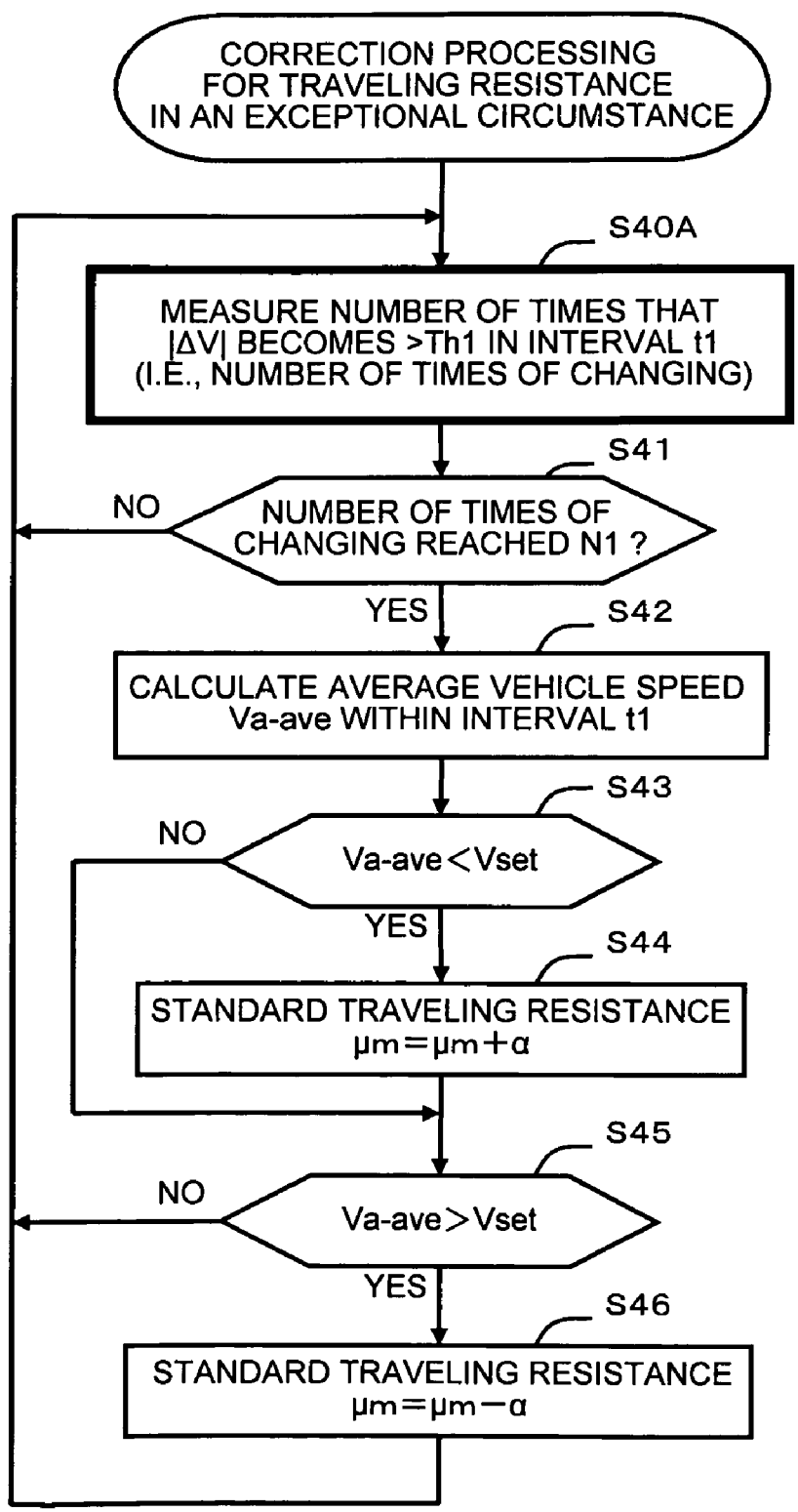
FIG. 18 is a flow chart showing second correction processing for correcting the standard traveling resistance in an exceptional circumstance.

FIG. 18 is a flow chart showing the correction processing for correction of the standard traveling resistance in an exceptional circumstance. In this embodiment, as explained above, only the first control method is performed. Due to this, the controller 2 measures the number of times within the interval t1 set in advance that the absolute value $|\Delta V|$ of the vehicle speed deviation becomes greater than a predetermined value Th1 (a step S40A). If this number of times (i.e., this number of times of changing) has reached a predetermined number of times N1 (YES in the step S41), then the standard traveling resistance is adjusted stepwise (the steps S42 through S46). Thus, with this embodiment having the above structure, similar advantages can be obtained to those of the first embodiment. Moreover, in this embodiment, it is possible to simplify the control structure, since only the first control method is performed.

It should be understood that the present invention is not limited to the embodiments described above. For a person skilled in the art, it is possible to make various additions and/or changes and so on, within the scope of the present invention. For example, if the transmission uses the planetary gear type and includes a clutch, then it is possible to eliminate the clutch 13, and to use a clutch within the transmission instead of the clutch 13. The present invention may also be applied in this case.

The invention claimed is:
1. A working vehicle comprising an engine, a splitter for dividing an output of the engine between a working apparatus system and a traveling system, a clutch connected to said engine via the splitter, a torque converter connected to the clutch, a transmission connected to the torque converter and transmitting drive force to drive wheels, a vehicle speed detection means which detects actual vehicle speed, and a controller which performs control so that the actual vehicle speed detected by the vehicle speed detection means becomes equal to a target vehicle speed set in advance, wherein said controller comprises:

a target drive force calculation means which calculates a target drive force required for implementing said target vehicle speed using a standard traveling resistance set in advance and vehicle body weight;

a target input rotational speed calculation means which calculates a target input rotational speed, being a target value for rotational speed to be inputted to said torque converter to provide the calculated target drive force;

an actual input rotational speed detection means which detects an actual rotational speed inputted to said torque converter; and a clutch pressure setting means which sets a clutch pressure for said clutch so that the detected actual input rotational speed becomes equal to said target input rotational speed.

2. A working vehicle according to claim 1, wherein said controller comprises a correction means for correcting said standard traveling resistance on the basis of a deviation between said target vehicle speed and said actual vehicle speed.

3. A working vehicle according to claim 2, wherein said correction means comprises a start condition determination means which makes a determination as to whether or not a start condition for correcting said standard resistance has become valid, and a standard traveling resistance setting means which changes said standard traveling resistance stepwise within a range set in advance, if it is determined by said start condition determination means that said start condition has become valid.

4. A working vehicle according to claim 3, wherein said start condition determination means determines that said start condition has become valid if, within a predetermined interval set in advance, the change of the drive force transmitted to a tire is less than or equal to a predetermined threshold value, and moreover the change of said actual vehicle speed is less than or equal to another predetermined threshold value.

5. A working vehicle according to claim 3, wherein said start condition determination means determines that said start condition has become valid if, within a predetermined interval set in advance, the change of the drive force transmitted to a tire is less than or equal to a predetermined threshold value, the change of said actual vehicle speed is less than or equal to another predetermined threshold value, and moreover a predetermined interval has elapsed from when correction was performed the previous time.

6. A working vehicle according to claim 3, wherein said start condition determination means detects a number of times, within a predetermined interval set in advance, that an absolute value of said deviation has exceeded a predetermined value set in advance, and determines that said start condition has become valid if the number of times has reached a predetermined number of times set in advance.

7. A working vehicle according to claim 1, wherein:
said target drive force calculation means is adapted to obtain a transmission input torque by obtaining a target drive force by multiplying said vehicle body weight by said standard traveling resistance, by obtaining an axle output torque by multiplying the target drive force by an effective radius of said drive wheel, and moreover by dividing the axle output torque by an axle gear ratio and also by a gear ratio corresponding to the speed stage set for said transmission; and said target input rotational speed calculation means is adapted to calculate said target input rotational speed on the basis of an output rotational speed detected by an output rotational speed detection means which detects the output rotational speed from said torque converter, and of said transmission input torque obtained from said target drive force calculation means.

8. A working vehicle according to claim 1, wherein:
said controller is adapted to execute both a first control method if the deviation between said target vehicle speed and said actual vehicle speed is less than a threshold value set in advance, and a second control method if said deviation is greater than or equal to said threshold value; and:

in said first control method, the following steps are executed:

a step of calculating the target drive force required for implementing said target vehicle speed, using a standard traveling resistance set in advance and vehicle body weight;

a step of calculating the target input rotational speed, being a target value for rotational speed to be inputted to said torque converter to provide the calculated target drive force;

a step of detecting the actual rotational speed inputted to said torque converter; and a step of setting the clutch pressure for said clutch so that the detected actual input rotational speed becomes equal to said target input rotational speed; and in said second control method, the following step is executed:

a step of decreasing said clutch pressure by a predetermined value set in advance if said actual vehicle speed is greater than said target vehicle speed, and increasing said clutch pressure by said predetermined value if said actual vehicle speed is smaller than said target vehicle speed.

9. A working vehicle according to claim 8, wherein:
said controller comprises a correction means for correcting said standard traveling resistance on the basis of the deviation between said target vehicle speed and said actual vehicle speed;

said correction means has a first correction mode and a second correction mode;

in said first correction mode, said standard traveling resistance is changed if, during a predetermined interval set in advance, the change of the drive force transmitted to a tire is less than or equal to a predetermined threshold value, and moreover the change of said actual vehicle speed is less than or equal to another predetermined threshold value; and in said second correction mode, said standard traveling resistance is changed if, during a predetermined interval set in advance, a number of times of transition between said first control method and said second control method has reached a predetermined number of times.

10. A method for controlling the vehicle speed of a working vehicle comprising an engine, a clutch connected to the engine, a torque converter connected to the clutch, a transmission connected to the torque converter and transmitting drive force to drive wheels, and a vehicle speed detection means which detects actual vehicle speed, wherein the following steps are executed:

a step of calculating a target drive force required for implementing a target vehicle speed set in advance, using a standard traveling resistance set in advance and vehicle body weight;

a step of calculating a target input rotational speed, being a target value for rotational speed to be inputted to said torque converter to provide the calculated target drive force;

a step of detecting an actual rotational speed inputted to said torque converter; and a step of setting a clutch pressure for said clutch so that the detected actual input rotational speed becomes equal to said target input rotational speed.

11. A vehicle speed control method of a working vehicle according to claim 10, comprising a correction step for correcting said standard traveling resistance on the basis of a deviation between said target vehicle speed and said actual vehicle speed.

12. A vehicle speed control method of a working vehicle according to claim 11, wherein said correction step includes a start condition determination step of making a determination as to whether or not a start condition for correcting said standard resistance has become valid, and a standard traveling resistance setting step of changing said standard traveling resistance stepwise within a range set in advance, if it has been determined by said start condition determination step that said start condition has become valid.

13. A vehicle speed control method of a working vehicle according to claim 12, wherein said start condition determination step determines that said start condition has become valid if, within a predetermined interval set in advance, change of the drive force transmitted to a tire is less than or equal to a predetermined threshold value, and moreover change of said actual vehicle speed is less than or equal to another predetermined threshold value.

14. A vehicle speed control method of a working vehicle according to claim 12, wherein said start condition determination step detects a number of times, within a predetermined interval set in advance, that an absolute value of said deviation has exceeded a predetermined value set in advance, and determines that said start condition has become valid if the number of times has reached a predetermined number of times set in advance.

15. A vehicle speed controller for controlling the vehicle speed of a working vehicle comprising an engine, a splitter for dividing an output of the engine between a working apparatus system and a traveling system, a clutch connected to said engine via the splitter, a torque converter connected to the clutch, a transmission connected to the torque converter and transmitting drive force to drive wheels, and a vehicle speed detection means which detects actual vehicle speed, comprising:

a target drive force calculation means which calculates a target drive force required for implementing said target vehicle speed using a standard traveling resistance set in advance and vehicle body weight;

a target input rotational speed calculation means which calculates a target input rotational speed, being a target value for rotational speed to be inputted to said torque converter to provide this calculated target drive force;

an actual input rotational speed detection means which detects an actual rotational speed inputted to said torque converter; and a clutch pressure setting means which sets a clutch pressure for said clutch so that the detected actual input rotational speed becomes equal to said target input rotational speed.

* * * * *